United States Patent
Adachi

(10) Patent No.: US 10,296,205 B2
(45) Date of Patent: May 21, 2019

(54) USER INTERFACE FOR CONTROLLING A DISPLAY SCALE OF AN IMAGE

(71) Applicant: SONY MOBILE COMMUNICATIONS INC., Minato-ku (JP)

(72) Inventor: Hiroaki Adachi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 13/668,853

(22) Filed: Nov. 5, 2012

(65) Prior Publication Data
US 2013/0147731 A1  Jun. 13, 2013

Related U.S. Application Data

(60) Provisional application No. 61/569,548, filed on Dec. 12, 2011.

(51) Int. Cl.
G06F 3/0484 (2013.01)
G06F 3/0488 (2013.01)

(52) U.S. Cl.
CPC ...... G06F 3/04883 (2013.01); G06F 3/04845 (2013.01); G06F 2203/04806 (2013.01)

(58) Field of Classification Search
CPC ............................................. G06F 2203/04806
USPC .................... 345/173–178; 178/18.01–20.04
See application file for complete search history.

(56) References Cited

U.S. PATENT DOCUMENTS

| | | | |
|---|---|---|---|
| 6,052,110 A | 4/2000 | Sciammarella | |
| 2006/0238644 A1* | 10/2006 | Lee | H04N 5/2251 348/373 |
| 2007/0174416 A1* | 7/2007 | Waters | G06F 1/1626 709/217 |
| 2008/0129759 A1 | 6/2008 | Jeon et al. | |
| 2008/0284738 A1* | 11/2008 | Hovden | G06F 1/1626 345/173 |
| 2009/0278974 A1* | 11/2009 | Kuwahara et al. | 348/333.06 |
| 2010/0079501 A1 | 4/2010 | Ikeda et al. | |
| 2010/0117962 A1* | 5/2010 | Westerman | G06F 3/03543 345/163 |

(Continued)

FOREIGN PATENT DOCUMENTS

| CN | 101539833 A | 9/2009 |
|---|---|---|
| CN | 101626450 A | 1/2010 |

(Continued)

OTHER PUBLICATIONS

U.S. Appl. No. 13/761,680, filed Feb. 7, 2013, Adachi.
Chinese Office Action dated Apr. 1, 2015 in Chinese Application No. 201210524155.6 with English translation, 20 pages.
U.S. Appl. No. 14/604,894, filed Jan. 26, 2015, Adachi.

(Continued)

Primary Examiner — Ryan A Lubit
(74) Attorney, Agent, or Firm — Xsensus LLP

(57) ABSTRACT

An information processing apparatus including a display and a touch panel disposed on or integrally formed with the display that detects a touch input by a user. The information processing apparatus setting initial coordinates corresponding to a first position of a touch input detected by the touch panel; setting a first region and a second region of the display based on the initial coordinates; and controlling the display to change a scale of a displayed image based on a distance between the initial coordinates and a second position of the touch input continuously detected by the touch panel in one of the first and second regions.

17 Claims, 28 Drawing Sheets

(56) References Cited

U.S. PATENT DOCUMENTS

| | | | | |
|---|---|---|---|---|
| 2010/0232704 A1* | 9/2010 | Thorn | ................. | G06F 3/04845 382/195 |
| 2011/0006978 A1* | 1/2011 | Yuan | ...................... | G06F 3/013 345/156 |
| 2011/0074719 A1* | 3/2011 | Yeh et al. | ..................... | 345/173 |
| 2011/0119620 A1* | 5/2011 | Schon | ................... | G06F 3/0416 715/785 |
| 2011/0298830 A1* | 12/2011 | Lam | ................... | G06F 3/04883 345/661 |
| 2011/0304573 A1* | 12/2011 | Smith | ................. | G06F 3/04883 345/173 |

FOREIGN PATENT DOCUMENTS

| | | |
|---|---|---|
| CN | 101943982 A | 1/2011 |
| CN | 102165405 A | 8/2011 |
| JP | 2007-028536 | 2/2007 |
| WO | WO 2010/095783 A1 | 8/2010 |

OTHER PUBLICATIONS

Combined Chinese Office Action and Search Report dated Dec. 14, 2015 in Patent Application No. 201210524155.6 (with English language translation).

European Search Report dated Jun. 24, 2016, issued in European Patent Application No. 12194188.4.

European Search Report dated Sep. 26, 2016, issued in European Patent Application No. 121941884.4. (15 pages).

Chinese Office Action, dated Aug. 22, 2016, in Chinese Application No. 201210524155.6 (with partial English Translation).

* cited by examiner

USER INTERFACE FOR CONTROLLING A DISPLAY SCALE OF AN IMAGE

CROSS REFERENCE TO RELATED APPLICATION

The present application claims the benefit of the earlier filing date of U.S. Provisional Patent Application Ser. No. 61/569,548 filed on Dec. 12, 2011, the entire contents of which is incorporated herein by reference.

BACKGROUND

Field of the Disclosure

The present disclosure relates to a display processing device favorably applied to electronic devices having a function to display a displayed item as to a display unit, such as a cellular phone, PHS telephone (PHS: Personal Handyphone System), PDA device (PDA: Personal Digital Assistant), electronic camera device, electronic video camera device, portable gaming device, notebook-type personal computer device, and the like, and more specifically, it relates to a display processing device that performs enlarging processing of the displayed item or performs reducing processing of the displayed item, according to predetermined operations by an operator.

Description of Related Art

Today, there are cellular phones having a display scale change function whereby the display scale of a display item that is displayed on the display unit is changed according to operations by an operator.

In the case of this cellular phone, a hardware key for performing change operations of the display scale is provided on the housing. A user operates the hardware key to perform change operations of the display scale of the display item that is displayed on the display unit.

Alternatively, there are known cellular phones that display a software key instead of a hardware key for performing change operations of the display scale as to the display unit. The operator operates the software key to perform change operations of the display scale of the display item that is displayed on the display unit.

SUMMARY

However, conventional cellular phones that have a display scale change function have to provide a hardware key for performing change operations of display scale on the housing, or display a software key on the display unit to perform change operations of display scale.

Thus, conventional cellular phones have had a problem in that a dedicated physical installation region for the hardware key is needed on the housing. Alternatively, conventional cellular phones have had a problem of needing a physical display region on the display unit to display the software key.

Also, with conventional cellular phones, the installation position of the hardware key is in a predetermined position on the housing. Similarly, the display position of the software key is a predetermined display position on the display unit.

This means that, in the case of operating a hardware key or in the case of operating a software key, the operator has to perform change operations of display scale with a certain operating position. Therefore, conventional cellular phones have had a problem in that, depending on the display position of the display item of which the display scale is to be changed, or the operational situation of the operating object, or the like, changing operations of display scale can be difficult.

This problem results from the installation position of the hardware key or the display position of the software key having been fixed, and the position of the hardware key or software key unable to be moved according to the display position of the display item or the operational situation of the operating item or the like.

In view of the shortcomings outlined above, the present disclosure is directed to an information processing apparatus comprising: a display; a touch panel disposed on or integrally formed with the display that detects a touch input by a user; and a controller that sets initial coordinates corresponding to a first position of a touch input detected by the touch panel; sets a first region and a second region of the display based on the initial coordinates; and controls the display to change a scale of a displayed image based on a distance between the initial coordinates and a second position of the touch input continuously detected by the touch panel in one of the first and second regions.

According to another exemplary embodiment, the disclosure is directed to a method performed by an information processing apparatus including a display and a touch panel disposed on or integrally formed with the display that detects a touch input by a user, the method comprising: setting initial coordinates corresponding to a first position of a touch input detected by the touch panel; setting a first region and a second region of the display based on the initial coordinates; and controlling the display to change a scale of a displayed image based on a distance between the initial coordinates and a second position of the touch input continuously detected by the touch panel in one of the first and second regions.

According to another exemplary embodiment, the disclosure is directed to a non-transitory computer-readable medium including a computer program, which, when executed by an information processing apparatus including a display and a touch panel disposed on or integrally formed with the display that detects a touch input by a user, causes the information processing apparatus to perform a process comprising: setting initial coordinates corresponding to a first position of a touch input detected by the touch panel; setting a first region and a second region of the display based on the initial coordinates; and controlling the display to change a scale of a displayed image based on a distance between the initial coordinates and a second position of the touch input continuously detected by the touch panel in one of the first and second regions.

DETAILED DESCRIPTION

The present disclosure can be applied to a cellular phone as an example.

[First Embodiment]

(Configuration of Cellular Phone)

Figure 1:
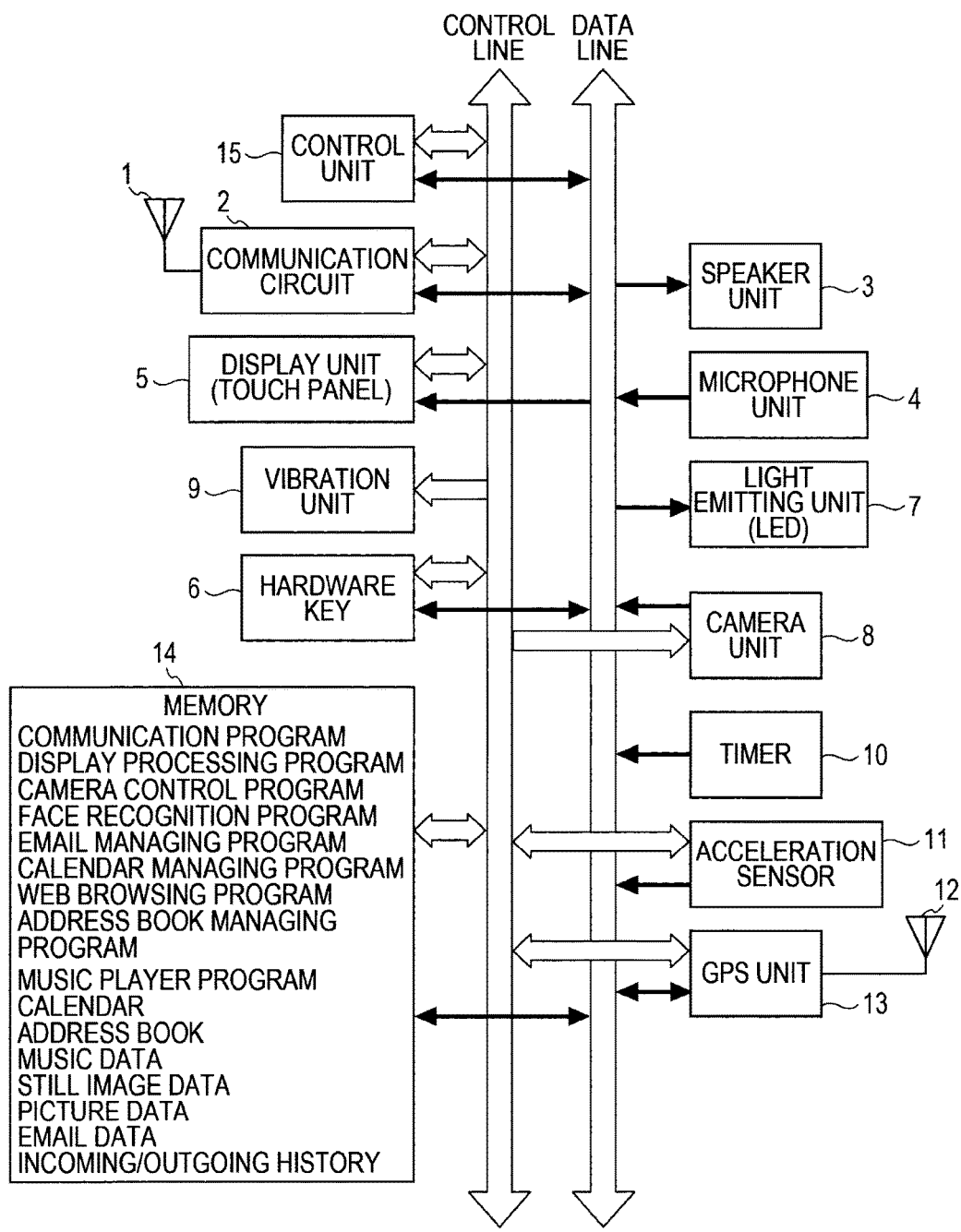
FIG. 1 is a block diagram of a cellular phone according to a first embodiment to which the present disclosure has been applied.

FIG. 1 is a block diagram of a cellular phone according to a first embodiment of the present disclosure. As shown in FIG. 1, the cellular phone according to the first embodiment has an antenna 1 and communication circuit 2 to perform wireless communication such as voice communication with a base station, television telephone communication, email, Web data (Web: World Wide Web), and so forth.

Also, the cellular phone has a speaker unit 3 to obtain acoustic output of received voice and the like, a microphone unit 4 to collect sending voice and the like, a display unit 5 which is a so-called touch panel, and multiple hardware keys 6 that are physically provided as to the housing of the cellular phone.

Also, the cellular phone has a light emitting unit 7 (LED: Light Emitting Diode) to notify, by light, the user of sent or received communications or the like, a camera unit 8 to image a still image or moving picture of a desired subject, a vibration unit 9 to vibrate the housing of the cellular phone and notifying the user of sent or received communications or the like, and a timer 10 for counting the current point-in-time.

Also, the cellular phone has an acceleration sensor 11 to detect vibration operations or the like applied to the housing of the cellular phone, a GPS antenna 12 (GPS: Global Positioning System) and GPS unit 13 to detect the current position of the cellular phone or the imaging position or the like of the still image and moving picture imaged with the camera unit 8.

Also, the cellular phone has a memory 14 wherein a communication program and various types of application programs to perform wireless communication processing via the base station, as well as various types of data and the like handled with these various types of application programs, are stored, and a control unit 15 to control the actions of the entire cellular phone.

A "projection-type capacitance method touch panel" is provided as the touch panel, which is the display unit 5. The projection-type capacitance method touch panel has an insulating film and an electrode layer therebelow, and further a substrate layer having a control IC (controlling integrating circuit).

On the electrode layer below the insulating film, a large number of mosaic-form electrode patterns made up of two horizontal and vertical layers with transparent electrodes such as ITO (Indium Tin Oxide) are disposed on a substrate such as glass or plastic.

The projection-type capacitance method touch panel detects the capacitance change of the electrodes from the two vertical and horizontal electrode rows by contact operations or non-contact operations to identify the operation position. By providing multiple electrode rows in each of the vertical direction and horizontal direction, many points of contact operations can be detected.

Note that in this example, a "projection-type capacitance method touch panel" is provided as the display unit 5, but instead of this "projection-type capacitance method touch panel", a so-called "display-type capacitance method touch panel" may be provided.

In the memory 14 is stored the above-mentioned communication program, as well as a display processing program to perform display scale change control of a display item displayed on the display unit 5.

Also, a camera control program to perform imaging control of still images and moving pictures by the camera unit 8, as well as to perform imaging scaling of a subject to be subjected to imaging, and display scale change control of imaged images is stored in the memory 14.

The present disclosure is applied to imaging scale change control functions of the display processing program and camera control program on this cellular phone.

The example in which the present disclosure is applied to the display processing program is described as a first embodiment through fifth embodiment. Also, an example in which the present disclosure is applied to the imaging scaling and display scale change control functions of the above-mentioned camera control program is described later as a sixth embodiment through tenth embodiment.

Returning to the original description, besides the various programs described above, a face recognition processing program for recognition processing of the image of a human face from an image displayed on the display unit 5, an email managing program to control creation and transmission/reception of email, and a calendar managing program to perform managing of a calendar on which the schedule of a user is registered, are stored in the memory 14.

Also, a Web browsing program to perform Web page viewing or the like by accessing a server device provided on a predetermined network such as a communication network or the Internet and transmitting/receiving information, an address book managing program to perform managing of an address book wherein registration of personal information such as names, addresses, phone numbers, email address, face photographs and so forth of friends and acquaintances and the like (i.e. registration region of the personal information) is performed, and a music player program to perform playing of music data, are stored in the memory 14.

Also, a calendar on which a desired schedule of the user is registered (i.e. a calendar data registration region) and an address book in which user names, still images (face photographs and the like), addresses, telephone numbers, email addresses, dates of birth, and so forth of friends and acquaintances and the like are registered (i.e. registration region of personal information for each user) is stored in the memory 14.

Also, music data played based on the music player program, still image data and moving picture data played based on a viewer function and a moving picture playing function of the camera control program, transmitted/received email data, and history of incoming/outgoing telephone calls and emails, are stored in the memory 14.

(Change Processing Actions of Display Scale)

Such a cellular phone according to the first embodiment have enabled display scale change operations of display items that are displayed on the display unit 5, by a user touching the operator at a desired location on the display unit 5 with a finger or the like, and sliding the touching finger.

Figure 2:
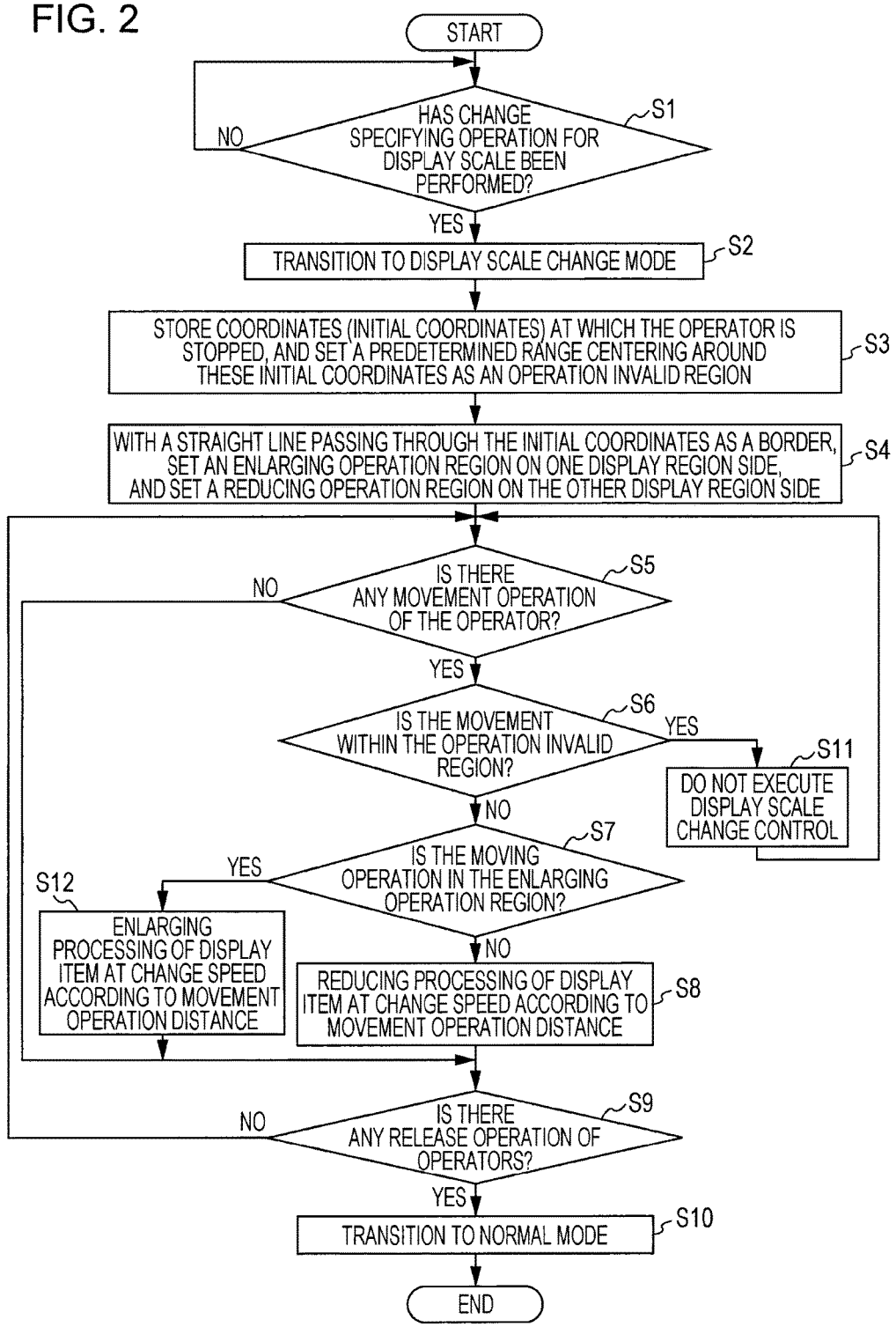
FIG. 2 is a flowchart to describe display scale change processing actions of a display item on a cellular phone serving as the first embodiment and display scale change processing actions on a camera through image of a cellular phone serving as a sixth embodiment.

The flowchart in FIG. 2 shows the flow of this sort of display scale change processing of a display item. Upon main power of the cellular phone being turned on, the control unit 15 of the cellular phone starts the processing shown in the flowchart in FIG. 2, based on the display processing program stored in the memory 14.

In step S1, the control unit 15 monitors whether or not there are any predetermined operations for specifying change operations of the display scale of a display item displayed on the display unit 5. For example, in the case of specifying a change to display scale on a cellular phone according to the present embodiment, the user operates by touch with an operator such as a finger at an optional position on the display unit 5, while in a state wherein a desired still image stored in the memory 14 or a desired Web page image or the like is displayed on the display unit 5, and waits for a certain amount of time or greater to pass while the finger is still touching (long-pressing operation).

Upon detecting the long-pressing operation at the same location on the display unit 5 based on the timing information of the timer 10, the control unit 15 advances the processing to step S2, and transitions to display scale change mode.

Note that in this example, an operation that is a trigger for the control unit 15 to transition to display scale change mode is a long-pressing operation at the same location on the display unit 5, but the control unit 15 may transition to display scale change mode in the event that a touching operation at any position on the display unit 5 is detected. Alternatively, the control unit 15 may transition to display scale change mode in the event that a predetermined sliding operation on the display unit 5 is detected.

Also, the display unit 5 which is a capacitance method touch panel detects operation positions on the display unit 5, based on changes to the capacitance values. The change in capacitance values occurs when an operator touches the display unit 5. Also, capacitance value changes occur when the operator nears the display unit 5, even without the operator touching the display unit 5.

Therefore, a long-pressing operation or the like can be performed, even with a non-contact operation that accompanies change to capacitance values. Accordingly, the concept of "touching operation" used in the description of the embodiments below and with the present disclosure should be understood as a concept that also includes "non-contact operation" that changes capacitance values as well as contact operations whereby the operator touches the display unit 5.

Next, upon transitioning to display scale change mode, in step S3 the control unit 15 stores in the memory 14 the coordinates on the display unit 5 on which the finger of the user is stopped as initial coordinates, and as shown in FIG.

3, sets a predetermined range centering around the initial coordinates as an operation invalid region which invalidates change operations of display scale by the user, and advances the processing to step S4.

Figure 3:
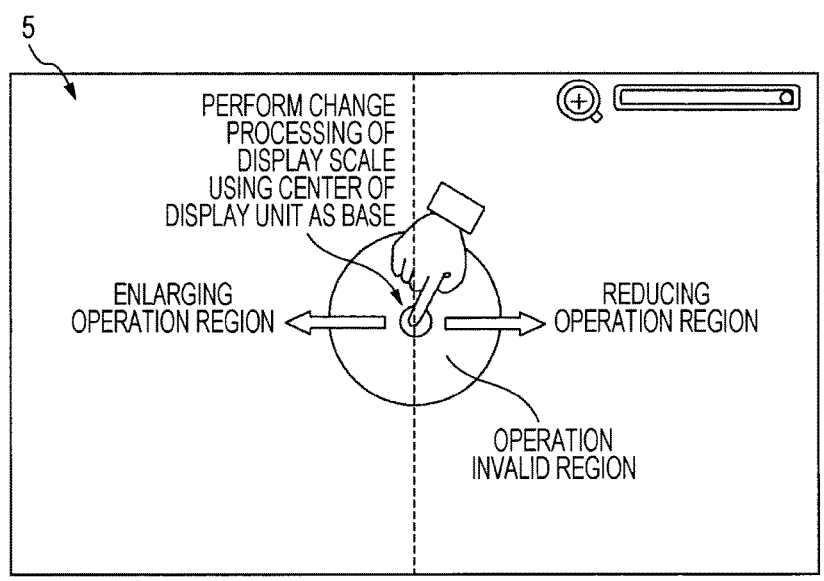
FIG. 3 is a diagram to describe initial coordinates and so forth to serve as a base for display scale change processing actions of a cellular phone according to the first embodiment.

In step S4, as shown in FIG. 3 the control unit 15 sets an enlarging operation region for accepting enlarging operations on one of the display region sides, with a straight line passing through the initial coordinates as a border, and sets a reducing operation region for accepting reducing operations on the other display region side, and advances the processing to step S5.

Note that in the example shown in FIG. 3, upon transitioning to display scale change mode, the control unit 15 divides the display region into two parts left and right with a straight line (or a curved line may be used) passing through the initial coordinates as a border, one of the display region sides is set as the enlarging operation region and the other display region side is set as a reducing operation region, but conversely, one of the display region sides may be set as a reducing operation region, and the other display region side set as an enlarging operation region.

Figure 4A:
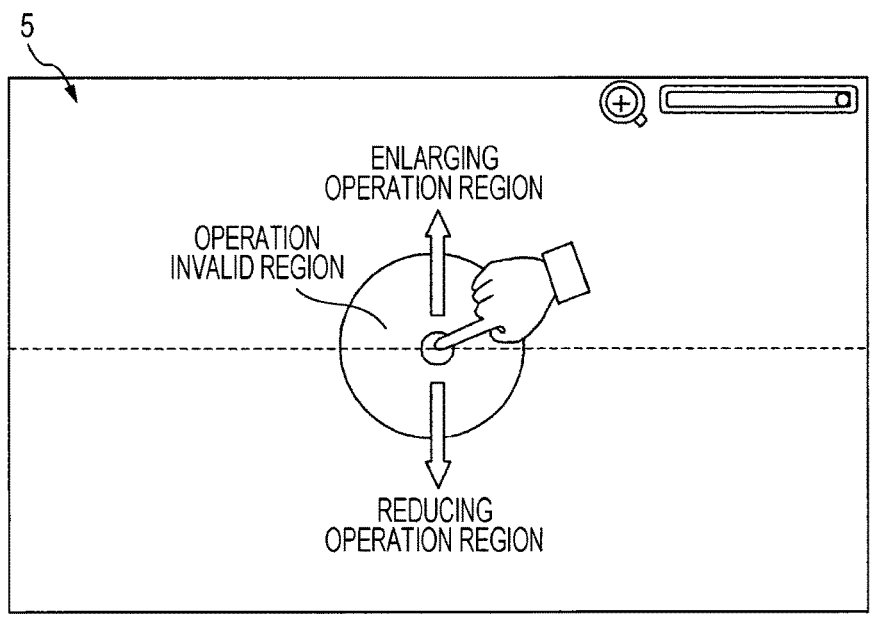
FIGS. 4A and 4B are diagrams to describe initial coordinates and so forth to serve as a base for display scale change processing actions of a cellular phone according to the first embodiment.

Additionally, in the event of transitioning to display scale change mode, the control unit 15 may divide the display region into two parts of top and bottom as shown in FIG. 4A, with a straight line passing through the initial coordinates as a boundary, setting one of the display region sides as the enlarging operation region and setting the other display region side as a reducing operation region. Conversely, of the display regions divided into top and bottom, one of the display region sides may be set as a reducing operation region, and the other display region side set as an enlarging operation region.

Figure 4B:
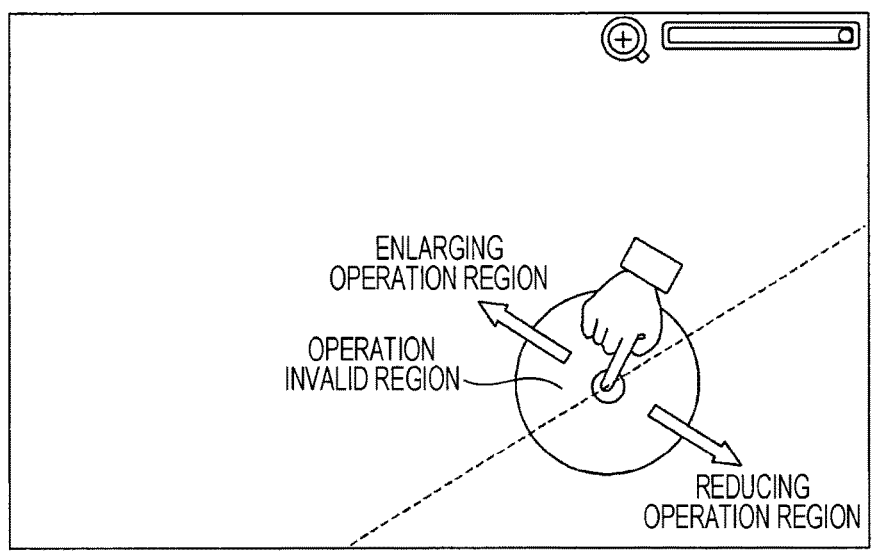

Also, in the event of transitioning to display scale change mode, the control unit 15 may divide the display region into two parts diagonally as shown in FIG. 4B, with a straight line passing through the initial coordinates as a boundary, setting one of the display region sides as the enlarging operation region and setting the other display region side as a reducing operation region. Conversely, of the display regions divided diagonally, one of the display region sides may be set as a reducing operation region, and the other display region side set as an enlarging operation region.

Next, as an example, in the case of performing enlarging operations of a display item on the cellular phone, the user operates the operator such as a finger that is touching and stopped at a position on the display unit 5 corresponding to the initial coordinates by moving in the enlarging operating region as shown by the arrow in FIG. 3.

Also, in the case of performing reducing operations of a display item on the cellular phone, the user operates the operator such as a finger that is touching and stopped at a position on the display unit 5 corresponding to the initial coordinates by moving in the reducing operating region as shown by the arrow in FIG. 3.

In step S5 of the flowchart in FIG. 2, the control unit 15 monitors whether or not there is movement by the operator which is stopped at the initial coordinates. That is to say, the control unit 15 detects a transition of coordinates at the touching operation position on the display unit 5, and based on this, determines the movement operation direction and operating region of the operator. In step S5, in the case of detecting a movement operation of the operator, the control unit 15 advances the processing to step S6, and in the case of not detecting a movement operation of the operator, advances the processing to step S9.

Upon advancing the processing to step S9 without detecting movement operations of the operator, the control unit 15 determines whether or not a release operation has been performed by the operator, which separates the operator touching the display unit 5 from the display unit 5.

With this cellular phone, in the case of stopping the display scale change operation, the user separates the operator such as finger that is touching the display unit 5 from the display unit 5. Therefore, upon detecting a release operation of the operator, the control unit 15 recognizes that a stopping instruction of the display scale change operation has been given by the user, and advances the processing to step S10. In step S10 the control unit 15 returns the mode of the control unit 15 from the display scale change mode to a normal mode which is a mode that enables general operations such as scrolling operations of a display item and text input operations and so forth, and ends the overall processing shown in the flowchart in FIG. 2.

On the other hand, upon detecting the movement operation of the operator and advancing the processing to step S6, the control unit 15 determines whether or not the region on the display unit 5 subjected to movement operation by the user is within the operation invalid region wherein display scale change operations are invalid.

In the case that the operator is positioned within the operation invalid region, the control unit 15 advances the processing to step S11 and does not perform display scale change processing of the display item. Therefore, the control unit 15 waits for the operator to be positioned outside of the invalid operation region, and advances the processing to step S7.

In step S7, the control unit 15 determines whether or not the operator is currently positioned in the enlarging operation region, based on the current coordinates of the operator. In the case of determining that the operator is currently positioned in the enlarging operation region, the control unit 15 advances the processing to step S12.

In step S12, the control unit 15 detects the distance between the current operating position in the enlarging operation region and the position corresponding to the initial coordinates, based on the coordinates of the operator in the enlarging operation region and initial coordinates, and changes the display scale at a speed according to this distance, while enlarging and displaying the display item displayed on the display unit 5 at the above changed display scale, and advances the processing to step S9.

Note that in the case of performing enlarging processing of the display item, the control unit 15 performs image data interpolation processing and so forth as to the image data of the display item that is to be subjected to enlarging processing, which is stored in the memory 14 or temporary storage memory or the like, thereby performing enlarging processing of the display item in a so-called digital manner, and displays this on a display unit 5.

In step S9, the control unit 15 determines whether or not there has been the above-described release operation of the operator, and if determination is made that the release operation has been made, in step S10 returns the mode of the control unit 15 from display scale change mode to normal mode, and ends the entire processing shown in the flowchart in FIG. 2.

Also, in step S9, upon determining that a release operation has not been performed, this means that the operation of the operator continues to be performed, and so the control unit 15 returns the processing to step S5, and monitors again whether or not there is any movement operation of the operator.

On the other hand, in step S6 and step S7, determining that the operator is currently outside of the operation invalid region and is also positioned outside the enlarging operation region means that the operator is currently positioned in the reducing operation region.

Therefore, in the case of determining in step S7 that the operator is currently positioned outside the enlarging operation region, the control unit 15 advances the processing to step S8 and detects the distance between the current operating position in the reducing operation region and the position corresponding to the initial coordinates, based on the coordinates of the operator in the reducing operation region and initial coordinates, and changes the display scale at a speed according to this distance, while reducing and displaying the display item displayed on the display unit 5 at the above changed display scale, and advances the processing to step S9.

Note that in the case of performing reducing processing of the display item, the control unit 15 performs image data thinning processing and so forth as to the image data of the display item that is to be subjected to reducing processing, which is stored in the memory 14 or temporary storage memory or the like, thereby performing reducing processing of the display item in a so-called digital manner, and displays this on a display unit 5.

In step S9, the control unit 15 determines whether or not there has been the above-described release operation of the operator, and if determination is made that the release operation has been made, in step S10 returns the mode of the control unit 15 from display scale change mode to normal mode, and ends the entire processing shown in the flowchart in FIG. 2.

Also, in step S9, upon determining that a release operation has not been performed, this means that the operation of the operator continues to be performed, and so the control unit 15 returns the processing to step S5, and monitors again whether or not there is any movement operation of the operator.

Now, in the case of the cellular phone, the control unit 15 performs enlarging processing of the display item displayed on the display unit 5 until a release operation is detected in step S9, at a speed corresponding to the distance between the coordinates of the operation position in the enlarging operation region and the initial coordinates. Also, in the case of the cellular phone, the control unit 15 performs reducing processing of the display item displayed on the display unit 5 until a release operation is detected in step S9, at a speed corresponding to the distance between the coordinates of the operation position in the reducing operation region and the initial coordinates.

Therefore, if the user continues to position the operator in the enlarging operation region, or continues to position the operator in the reducing operation region, the control 15 performs variable control of the display scale change speed according to the operation distance, while continuously controlling the enlarging processing or reducing processing of the display item up to the maximum display scale or minimum display scale.

In the case of the cellular phone, in the case that stopping such enlarging processing or reducing processing of the display item is desired, the operator is returned to the operation invalid region or the operator is released from the display unit 5.

Whether or not the operator is positioned in the operation invalid region is determined by the control unit 15 in step S6 of the flowchart in FIG. 2. Upon determining that the operator is positioned in the operation invalid region in the event that the enlarging operation or reducing operation is performed, the control unit 15 advances the processing to step S11, and stops the enlarging operation or reducing operation.

Thus, the user performs movement operations in the enlarging operation region or reducing operation region, thereby changing the display scale of the display item displayed on the display unit 5, and moves the operator to the operation invalid region at a timing when the display item is displayed at a desired size, thereby stopping the enlarging processing or reducing processing, whereby the display item can be at the desired display scale.

Also, the case of releasing the operator from the display unit 5 is also the same. That is to say, the user performs display scale change operation of the display item displayed on the display unit 5, by moving in the enlarging operation region or reducing operation region, and releases the operator from the display unit 5 at a timing when the display item is displayed at a desired size. The control unit 15 detects the release operation in step S9 of the flowchart in FIG. 2, and stops the enlarging processing or reducing processing of the display item.

Thus, the user performs the release operation at the timing when the display item displayed on the display unit 5 is displayed at the desired size, whereby the enlarging processing or reducing processing of the display item is stopped and the display item can be at the desired display scale.

(Control of Display Scale Change Speed)

Figure 5A:
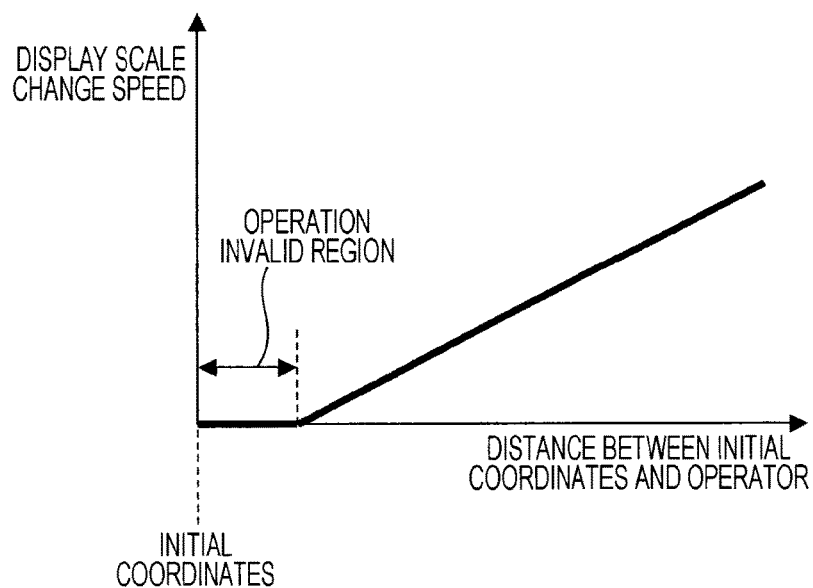
FIGS. 5A and 5B are diagrams to describe the relation between operational distance and change speed of display scale on a cellular phone according to the first embodiment.

Next, as an example, the relation between the "display scale change speed" and the "distance between the current operator coordinates and the initial coordinates" are shown in FIG. 5A. As can be seen from FIG. 5A, while the operator is positioned within the operation invalid region, the control unit 15 does not perform display scale change control. When the operator moves beyond the operation invalid region, with the timing thereof the control unit 15 linearly speeds up the display scale change speed.

Thus, as the distance between the current operator coordinates and the initial coordinates increases (i.e. as the operating distance lengthens), the enlarging speed gradually speeds up, and the display item is subjected to enlarging processing at high speed and is displayed on the display unit 5.

By causing the relation between the "display scale change speed" and the "distance between the current operator coordinates and the initial coordinates" to be a linear relation such as shown in FIG. 5A, each time the operating distance of the user (i.e. distance between the current operator coordinates and the initial coordinates) changes, the display scale change speed also changes, enabling a display scale change processing having good response as to the operations of the user (can respond well to the operations of the user).

Figure 5B:
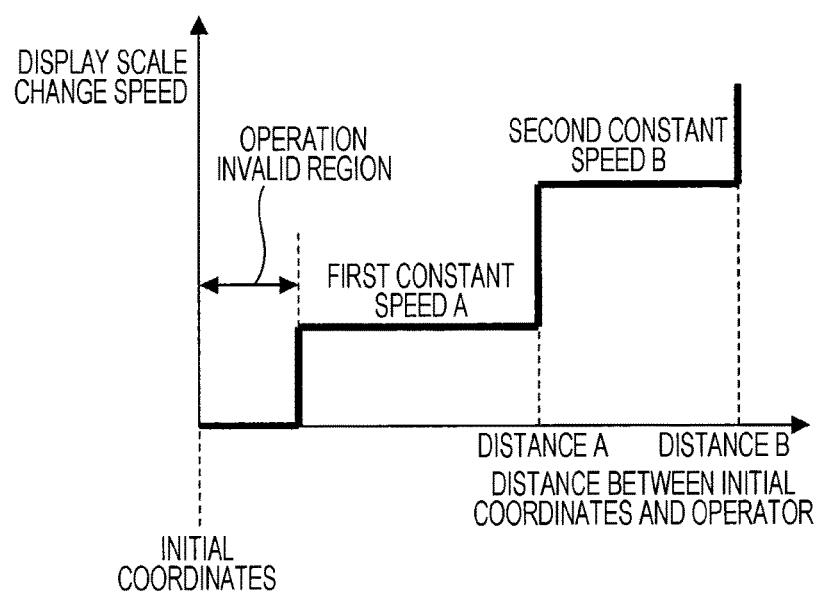

The relation between the "display scale change speed" and the "distance between the current operator coordinates and the initial coordinates" may also be as shown in FIG. 5B. The example shown in FIG. 5B is an example wherein, until the distance corresponding to between the initial coordinates and the operator coordinates becomes a predetermined distance A, the control unit 15 performs display scale change control at a first constant speed A which is a constant speed, and from the time that the distance corresponding to between the initial coordinates and the operator coordinates changes from the predetermined distance A to a predetermined distance B, performs display scale change control at a second constant speed B which is a constant speed that is faster than the first constant speed A and is also a constant speed.

If the relation between the "display scale change speed" and the "distance between the current operator coordinates and the initial coordinates" is the relation shown in FIG. 5B, until the distance between the current operator coordinates and initial coordinates become the distance A, the display item is subjected to enlarging processing at the display scale changed by the first constant speed A which is the same speed and is displayed on the display unit 5, and from the time that the distance between the current operator coordinates and initial coordinates changes from distance A to distance B, the display item is subjected to enlarging processing at the display scale changed at the second constant speed B which is a faster constant speed that the first constant speed A, and is displayed on the display unit 5.

Thus, until the operating distance becomes distance A, and from the time that the operating distance changes from distance A to distance B, display scale change control is performed at each of the first constant speed A or second constant speed B, and since the display scale change speeds are each constant, a stable display scale change operation is enabled.

(Specific Example of Enlarging Operation)

Next, FIG. 6A through FIG. 6E show a display example of a display item corresponding to enlarging operations by a user.

Figure 6A:
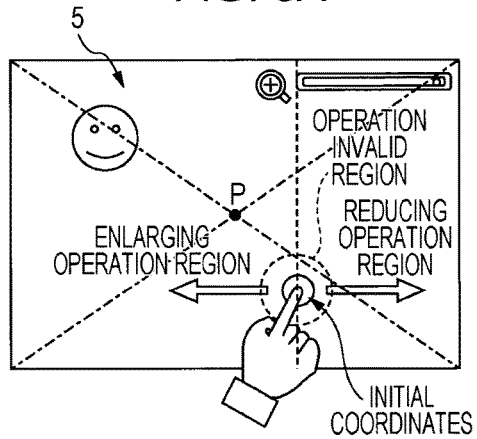
FIGS. 6A-6E are diagrams to describe enlarging operations of a display item on a cellular phone according to the first embodiment.

First, as shown in FIG. 6A, the user touches one location on the display unit 5 to operate, and when a certain amount of time has passed in the state of this touching operation, the control unit 15 transitions to display scale change mode, and sets the coordinates of the location that is touched as the initial coordinates.

Also, as shown by a surrounding dotted circle in FIG. 6A, a processing range centered around the initial coordinates is set as the operation invalid region (step Si through step S3).

Next, as shown by a dotted straight line in FIG. 6A, the control unit 15 divides the display region of the display unit 5 into left and right sides by a straight line (or a curved line may be used) passing through the initial coordinates, and one of the display regions is set as an enlarging operation region and the other display region is set as a reducing operation region (step S4).

Figure 6B:
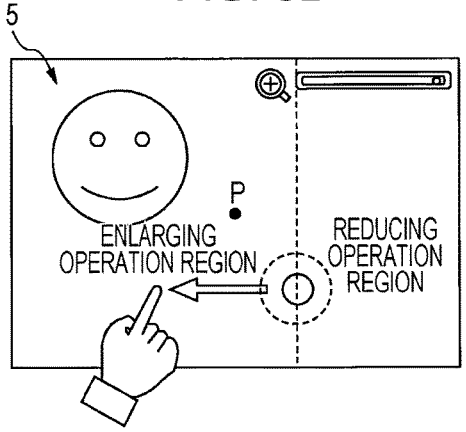

Next, the user moves the finger that is touching the position of the initial coordinates to the enlarging operation region in the state of touching the finger to the display unit 5, as shown in FIG. 6B. upon this moving operation being performed, the control unit 15 waits for the finger of the user to move outside of the operation invalid region (step S6 and step S11), changes the display scale at a speed corresponding to the distance between the current operation position coordinates in the enlarging operation region and the initial coordinates (movement operation distance), and performs enlarging processing of the display item with the center P on the display unit 5 as a base (step S12), so as to be at the changed display scale.

Figure 6C:
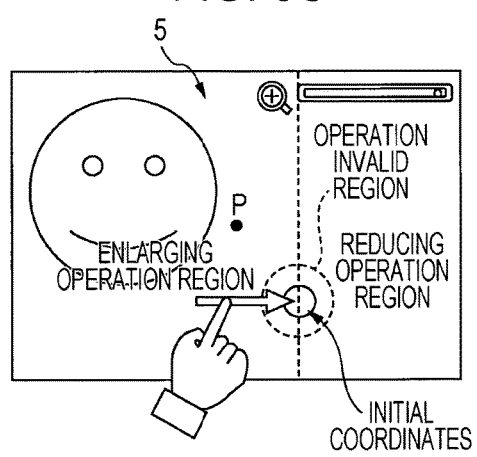

As shown in FIG. 6C, by the user returning the finger in the enlarging operation region to the direction of the initial coordinates and shortening the movement operation distance, the control unit 15 slows the display scale change speed in the amount that the movement operation distance has shortened, and continues the enlarging processing of the display item on which the center P on the display unit 5 is based, at the display scale changed by the slowed change speed.

Figure 6D:
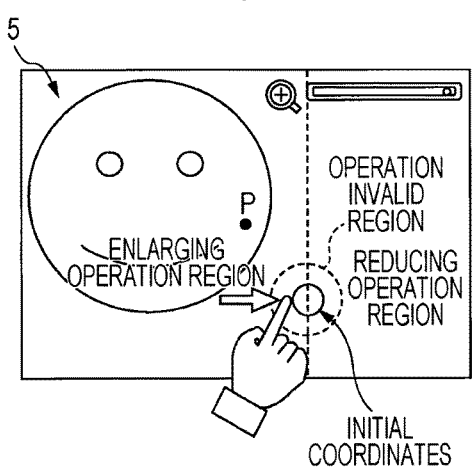

Next, in the event that the size of the display item enlarged and displayed on the display unit 5 is at the desired size, the user moves the finger that is touching to within the operation invalid region. Upon detecting that the finger of the user has moved into the operation invalid region, the control unit 15 performs control to stop the enlarging processing of the display item, as shown in FIG. 6D, and maintains the display scale of the display item displayed on the display unit 5 at the timing at which the finger of the user has moved into the operation invalid region (step S6 and step S11).

Figure 6E:
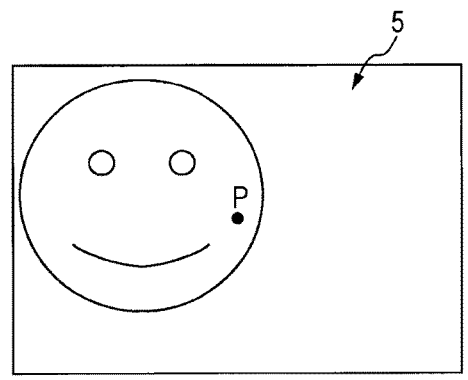

Alternatively, in the event that the size of the display item enlarged and displayed on the display unit 5 is at the desired size, the user performs a releasing operation to remove the finger that is touching from the display unit 5. Upon detecting the releasing operation, the control unit 15 performs control to stop the enlarging processing of the display item, as shown in FIG. 6E, and returns the information processing mode of the control unit 15 from display scale change mode to normal mode (step S9 and step S10). Thus, the display unit 5 displays the display item that has been enlarged at the display scale when the user has performed a release operation.

(Specific Example of Reducing Operation)

Next, a display example of a display item corresponding to a reducing operation by the user is shown in FIG. 7A through FIG. 7E.

Figure 7A:
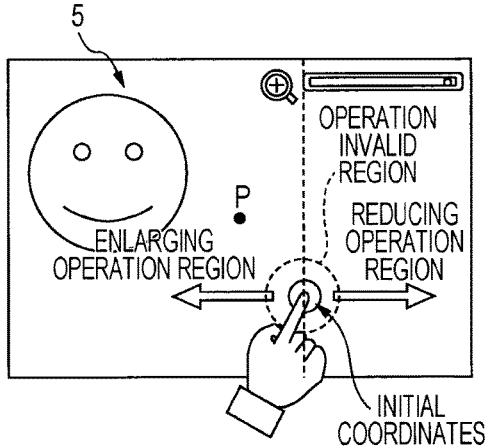
FIGS. 7A-7E are diagrams to describe reducing operations of a display item on a cellular phone according to the first embodiment.

First, as shown in FIG. 7A, the user touches one location on the display unit 5 to operate, and when a certain amount of time has passed in the state of this touching operation, the control unit 15 transitions to display scale change mode, and sets the coordinates of the location that is touched as the initial coordinates.

Also, as shown by a surrounding dotted circle in FIG. 7A, a processing range centered around the initial coordinates is set as the operation invalid region (step S1 through step S3).

Next, as shown by a dotted straight line in FIG. 7A, the display region of the display unit 5 is divided into left and right sides by a straight line (or a curved line may be used) passing through the initial coordinates, and one of the display regions is set as an enlarging operation region and the other display region is set as a reducing operation region (step S4).

Figure 7B:
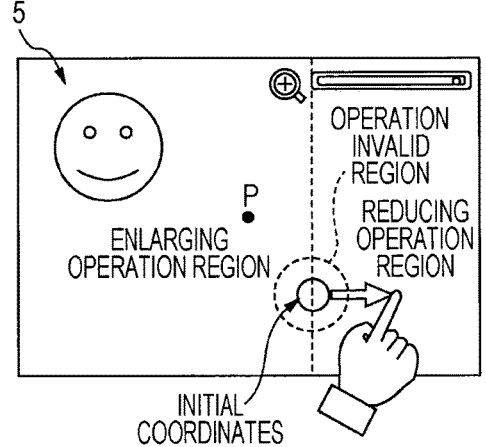

Next, the user moves the finger that is touching the position of the initial coordinates to the reducing operation region in the state of touching the finger to the display unit 5, as shown in FIG. 7B. Upon this moving operation being performed, the control unit 15 waits for the finger of the user to move outside of the operation invalid region (step S6 and step S11), changes the display scale at a speed corresponding to the distance between the current operation position coordinates in the reducing operation region and the initial coordinates (movement operation distance), and performs reducing processing of the display item with the center P on the display unit 5 as a base (step S12).

Figure 7C:
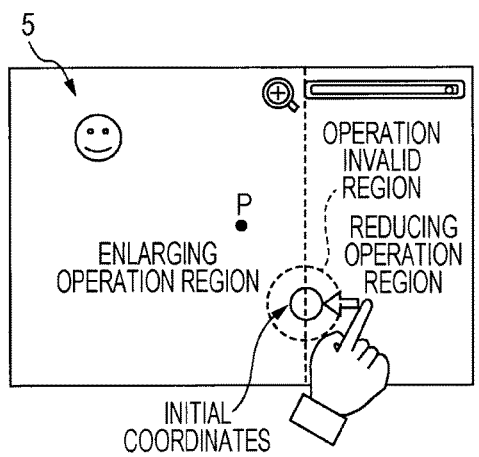

As shown in FIG. 7C, by the user returning the finger in the reducing operation region to the direction of the initial coordinates and shortening the movement operation distance, the control unit 15 slows the display scale change speed in the amount that the movement operation distance has shortened, and continues the reducing processing of the display item on which the center P on the display unit 5 is based, at the display scale changed by the slowed change speed.

Figure 7D:
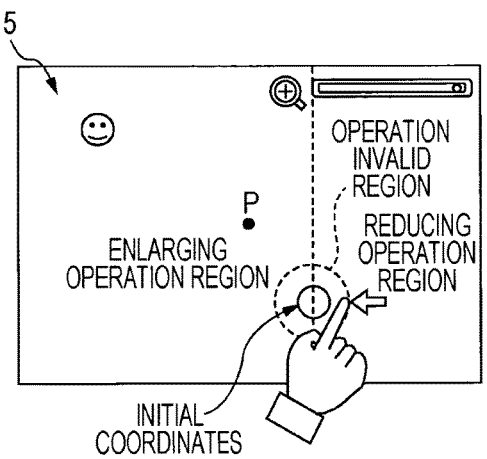

Next, in the event that the size of the display item reduced and displayed on the display unit 5 is at the desired size, the user moves the finger that is touching to within the operation invalid region. Upon detecting that the finger of the user has moved into the operation invalid region, the control unit 15 performs control to stop the reducing processing of the display item, as shown in FIG. 7D, and maintains the display scale of the display item displayed on the display unit 5 at the timing at which the finger of the user has moved into the operation invalid region (step S6 and step S11).

Figure 7E:
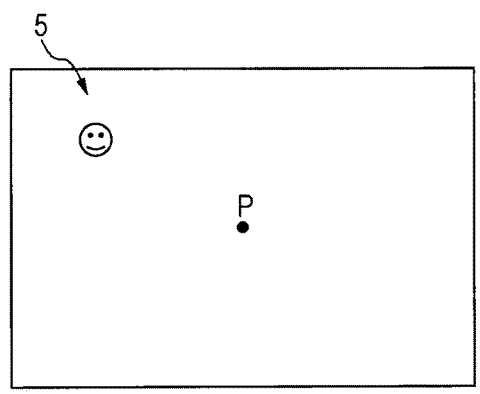

Alternatively, in the event that the size of the display item reduced and displayed on the display unit 5 is at the desired size, the user performs a releasing operation to remove the finger that is touching from the display unit 5. Upon detecting the releasing operation, the control unit 15 performs control to stop the reducing processing of the display item, as shown in FIG. 7E, and returns the information processing mode of the control unit 15 from display scale change mode to normal mode (step S9 and step S10). Thus, the display unit 5 displays the display item that has been reduced at the display scale when the user has performed a release operation.

[Advantages of the First Embodiment]

As is clear from the above description, with the cellular phone according to the first embodiment of the present disclosure, upon a predetermined operation being performed to specify the display scale change operation, such as a touching operation at the same location on the display unit 5 for a certain amount of time or longer (long-pressing operation), the control unit 15 sets the long-pressed location as initial coordinates, while setting an enlarging operation region for performing enlarging operations of a display item and a reducing operation region for performing reducing operations, with the initial coordinates herein as a base.

In the case that the enlarging operation region is operated by the user, the control unit 15 performs control to change the display scale at a speed corresponding to the distance between the coordinates corresponding to the operating location in the enlarging operation region and the initial coordinates, while enlarging the display item that is displayed on the display unit 5.

Also, in the case that the reducing operation region is operated by the user, the control unit 15 performs control to change the display scale at a speed corresponding to the distance between the coordinates corresponding to the operating location in the reducing operation region and the initial coordinates, while reducing the display item that is displayed on the display unit 5.

With such a cellular phone according to the first embodiment, display scale of the display item displayed on the display unit 5 can be changed with the simple operations of the user touching a desired position on the display unit 5 to operate, and moving the operator such as the touching finger to operate in the enlarging operation region or reducing operation region.

Therefore, in order to change the display scale of the display item, the desired position on the display unit 5 is to be touched and the touched finger is to be slid to operate, whereby a hardware key and software key for performing change operations of display scale is not needed.

Accordingly, a region for providing a hardware key on the housing of the cellular phone can be used for providing other necessary parts and so forth, so effective use of the housing can be made. Alternatively, in the case of not providing a hardware key on the housing of the cellular phone, a housing with less protrusions and concaves is enabled, whereby an improved cellular phone design is enabled.

Also, since a software key does not have to be displayed on the display unit, the inconvenience of the display item displayed on the display unit 5 and the software key overlapping one another, making the display item difficult to see, is prevented, and the display region on the display unit 5 can be effectively utilized.

[Second Embodiment]

Next, a cellular phone according to a second embodiment of the present disclosure will be described.

In the case of the cellular phone according to the first embodiment described above, in order to transition from an enlarging operation to a reducing operation, the operator positioned in the enlarging operation region has to temporarily be returned to a position near the initial coordinates, then the operator is operated to be moved to the reducing operation region. Similarly, in the case of the cellular phone according to the first embodiment described above, in order to transition from a reducing operation to an enlarging operation, the operator positioned in the reducing operation region has to temporarily be returned to a position near the initial coordinates, then the operator is operated to be moved to the enlarging operation region.

That is to say, in order to invert the display scale change control from enlarging processing to reducing processing, or from reducing processing to enlarging processing, temporarily the operator has to be returned to a position near the initial coordinates. Therefore, although only slightly, there is a problem in that operations are burdensome.

The cellular phone according to the second embodiment described below removes the burden of such operations, whereby the cellular phone has improved operability.

Specifically, the cellular phone according to the second embodiment enables inverted processing with good operability by resetting new initial coordinates as to operation position in the event that the display scale from the enlarging processing is at the maximum display scale, or that the display scale from the reducing processing is at the minimum display scale.

Note that the cellular phone according to the above-described first embodiment and the cellular phone according to the second embodiment to be described below differ only in this point. Therefore, in the description of the cellular phone according to the second embodiment, description of only this difference will be made, and duplicative descriptions will be omitted.

Figure 8:
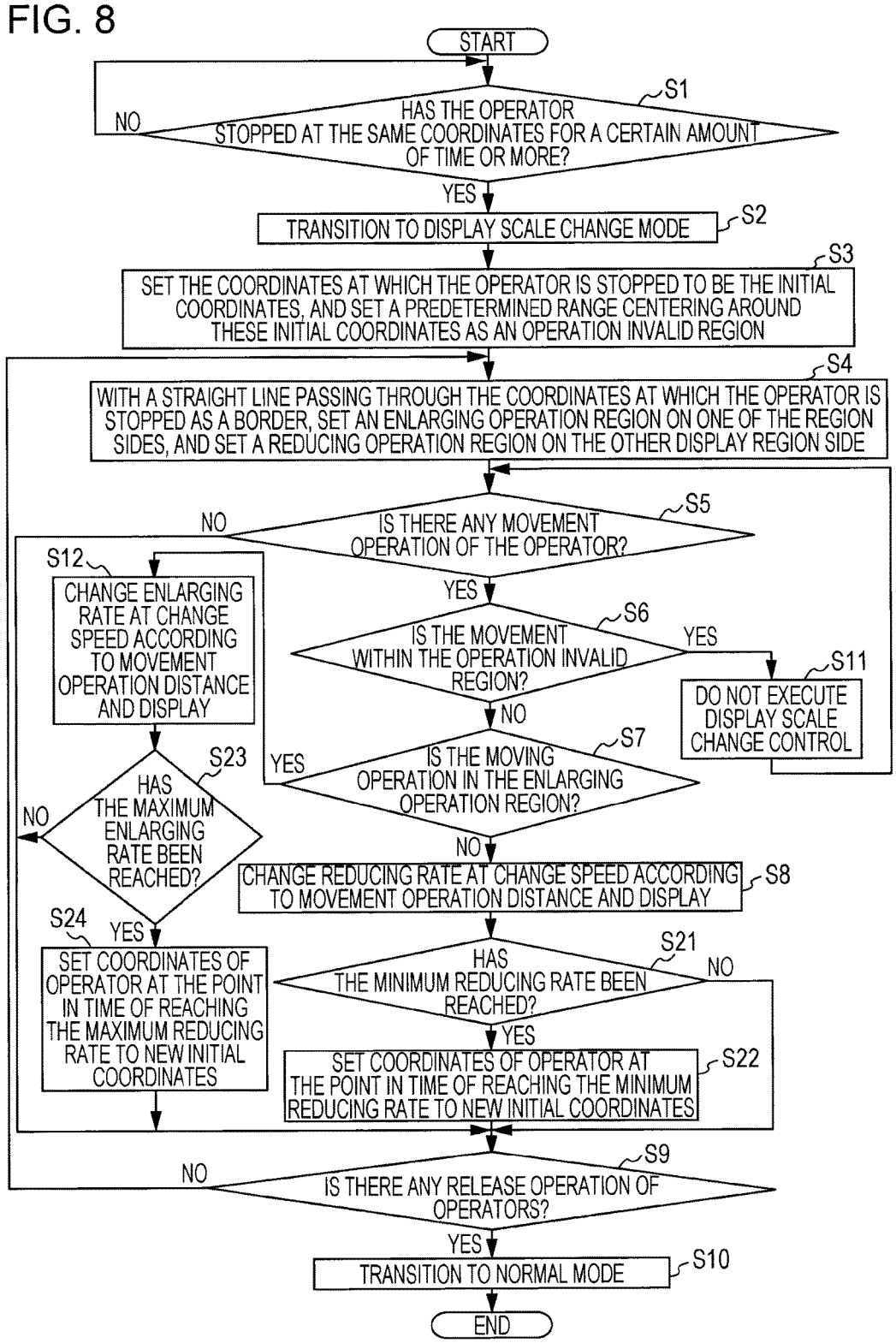
FIG. 8 is a flowchart to describe display scale change processing actions of a display item on a cellular phone serving as a second embodiment and display scale change processing actions of a camera through image on a cellular phone serving as a seventh embodiment of the present disclosure.

FIG. 8 shows a flowchart of display scale change processing actions on a cellular phone according to this second embodiment. Steps in the flowchart in FIG. 8 that perform the same processing as steps in the flowchart in FIG. 2 used in the event of describing the cellular phone according to the above-described first embodiment have the same step numbers referenced as the steps in the flowchart in FIG. 2. Therefore, for detailed description of the steps other than the steps corresponding to the differences described below, the descriptions of the first embodiment described above should be referenced, based on the step number.

Figure 9A:
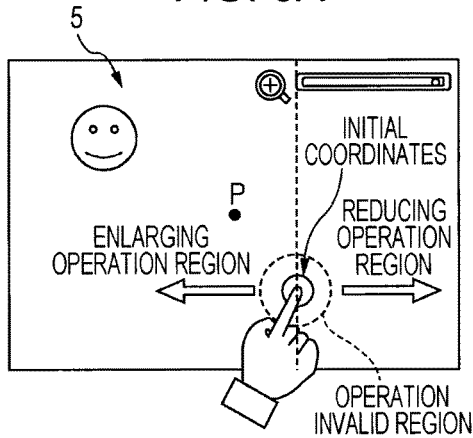
FIGS. 9A-9F are diagrams to describe resetting processing of initial coordinates on a cellular phone according to the second embodiment.
Figure 9B:
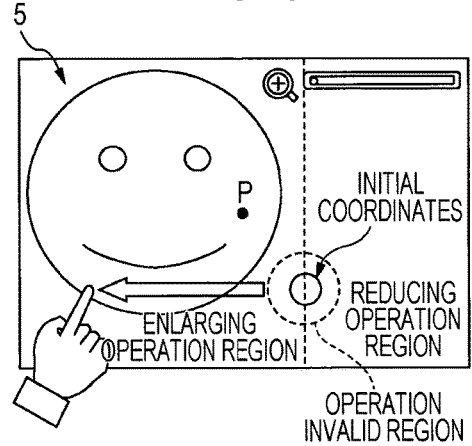

In the flowchart in FIG. 8, the operator is determined to be positioned in the enlarging operation region, whereby the processing is advanced from step S7 to step S12, and as shown in FIG. 9A and FIG. 9B, upon performing enlarging processing of a display item with the display scale changed at the speed corresponding to the distance between the current operation position in the enlarging operation region and the initial coordinates (movement operation distance), the control unit 15 advances the processing to step S23.

In step S23, the control unit 15 determines whether or not the display scale (in this case, the enlargement scale) that is changing at a speed according to the movement operation distance has reached the maximum enlargement scale. In the case of determining that the display scale has not reached the maximum enlargement scale, the enlarging processing of the display item cannot continue to be performed, whereby the control unit 15 advances the processing to step S9, and in the case of not detecting a release operation of the operator, continues to execute the enlarging processing corresponding to the operation of the user again.

Figure 9C:
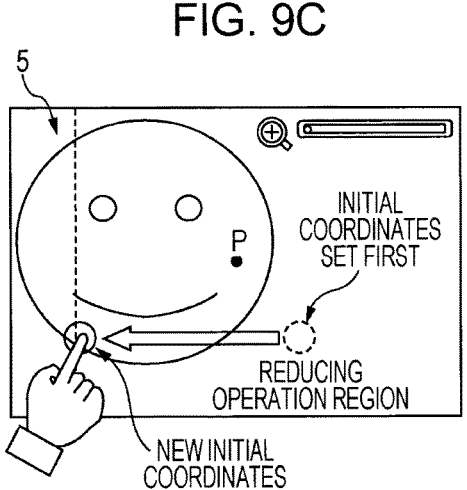

Conversely, in the case of determining that the display scale has reached the maximum enlargement scale, the control unit 15 advances the processing to step S24, and as shown in FIG. 9C, sets the coordinates of the operator at the point in time of arriving at the maximum enlargement scale to new initial coordinates, and returns the processing to step S4 via step S9. Note that along with the new initial coordinates, the operation invalid region corresponding to the new initial coordinates herein may be reset.

In step S4, the control unit 15 resets the enlarging operation region on one of the display region sides, with a straight line passing through the newly set initial coordinates as a border, and resets the reducing operation region on the other display region side. Note that this case is a case wherein the display scale has already reached the maximum enlargement scale, and any greater enlarging processing is difficult, whereby in step S4 herein, resetting only the enlarging operation region may be performed.

Figure 9D:
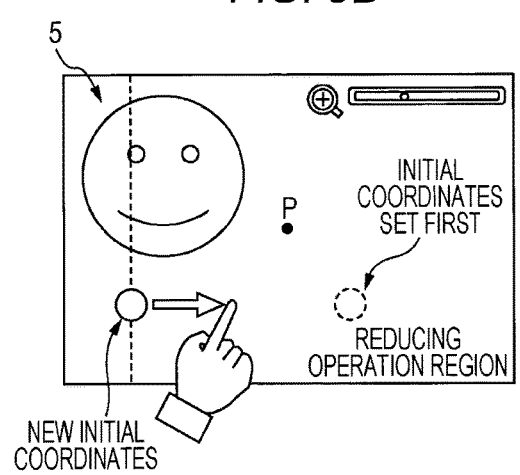

Next, in the case of subjecting a display item that has been subjected to enlarging processing to the maximum enlargement scale to reducing operations, the user moves the operator from the newly set initial coordinates in the direction of reducing operations which is the opposite direction as to the direction that the operator has been moved at time of enlarging operations, as shown in FIG. 9D. Thus, the operator of the user is to be positioned in the newly set reducing operation region.

Figure 9E:
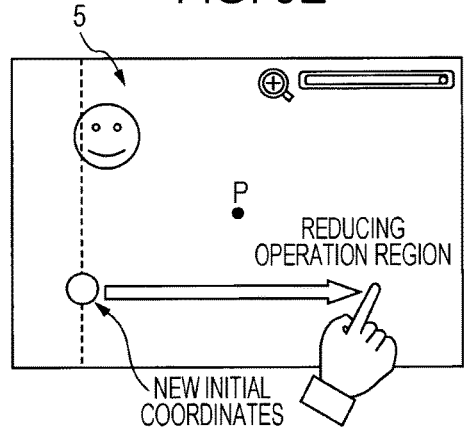

Upon determining that the operator of the user is positioned in the newly set reducing operation region, the control unit 15 in step S8 changes the display scale at a speed corresponding to the movement operation distance between the coordinates of the operator positioned in the newly set reducing operation region and the newly set initial coordinates, and the display item of the display unit 5 is subjected to reducing processing at the changed display scale and displayed, as shown in FIG. 9D and FIG. 9E.

Next, the control unit 15 advances the processing to step S21, and determines whether or not the display scale (in this case, the reduction scale) that is changed at the speed according to the movement operation distance has reached the minimum reduction scale. In the case determination is made that the display scale has not reached the minimum reduction scale, reducing processing of the display item can continue to be performed, whereby the control unit 15 advances the processing to step S9, and in the case of not detecting a release operation of the operator, the control unit 15 again continues to execute the reducing processing corresponding to the operations of the user.

Figure 9F:
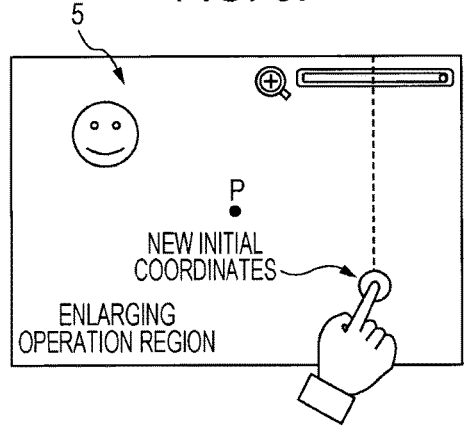

Conversely, in the case of determining that the display scale has reached the minimum reduction scale, as shown in FIG. 9F, the control unit 15 sets the coordinates of the operator at the point in time of reaching the minimum reduction scale to new initial coordinates, and returns the processing to step S4 via step S9. Note that along with the new initial coordinates, the operation invalid region corresponding to the new initial coordinates herein may be reset.

In step S4, the control unit 15 resets the enlarging operation region on one of the display region sides, with a straight line passing through the newly set initial coordinates as a border, and resets the reducing operation region on the other display region side. Note that this case is a case wherein the display scale has already reached the minimum reduction scale, and any further reduction processing is difficult, whereby in step S4 herein, resetting only the enlarging operation region may be performed.

[Advantages of Second Embodiment]

As is clear from the above description, with the cellular phone according to the second embodiment of the present disclosure, new initial settings are reset by display scale change operations as to an operating position in the event that the enlargement scale has reached the maximum enlargement scale or that the reduction scale has reached the minimum reduction scale, and the display scale is changed at a speed corresponding to the distance between the new initial coordinates and the coordinates of the operating position thereafter, thereby performing enlarging processing and reducing processing of a display item.

Thus, after the enlargement scale has reached the maximum enlargement scale or after the reduction scale has reached the minimum reduction scale, even if the operator is not returned to the position of the initial coordinates that were first set, reducing operations and enlarging operations can be performed from the position of the newly set initial coordinates of the operating position in the event that the enlargement scale has reached the maximum enlargement scale or the operating position in the event that the reduction scale has reached the minimum reduction scale.

In other words, upon the enlargement scale reaching the maximum enlargement scale by the user performing an enlarging operation, the operator can perform reducing operations of an enlarged display item just by operating so as to move in the direction opposite as to the direction wherein enlarging operations have been performed.

Similarly, upon the reduction scale reaching the minimum reduction scale by the user performing a reducing operation, the operator can perform enlarging operations of a reduced display item just by operating so as to move in the direction opposite as to the direction wherein reducing operations have been performed.

Therefore, returning the operator temporarily to the position of the initial coordinates in order to invert the display scale change control from enlarging processing to reducing processing, or from reducing processing to enlarging processing is not necessary, whereby enlarging operations or reducing operations of display items can be performed with good operability, while obtaining the same advantages of the cellular phone in the first embodiment described above.

[Third Embodiment]

Next, a cellular phone according to a third embodiment to which the present disclosure has been applied will be described.

In the cases of the cellular phone according to the first embodiment and the cellular phone according to the second embodiment described, enlarging processing or reducing processing of a display item is performed with the center P of the display unit 5 as a base.

Conversely, with the cellular phone according to the third embodiment, face recognition processing of a display item is performed, and in the case that a face is recognized, the face image herein is moved to the center P of the display unit 5 and thereafter enlarging processing or reducing processing is performed.

Note that the cellular phones according to the first embodiment and second embodiment described above and the cellular phone according to the third embodiment described below differ only in this point. Therefore, in the description of the cellular phone according to the third embodiment, only the difference will be described, and duplicative descriptions will be omitted.

Figure 10:
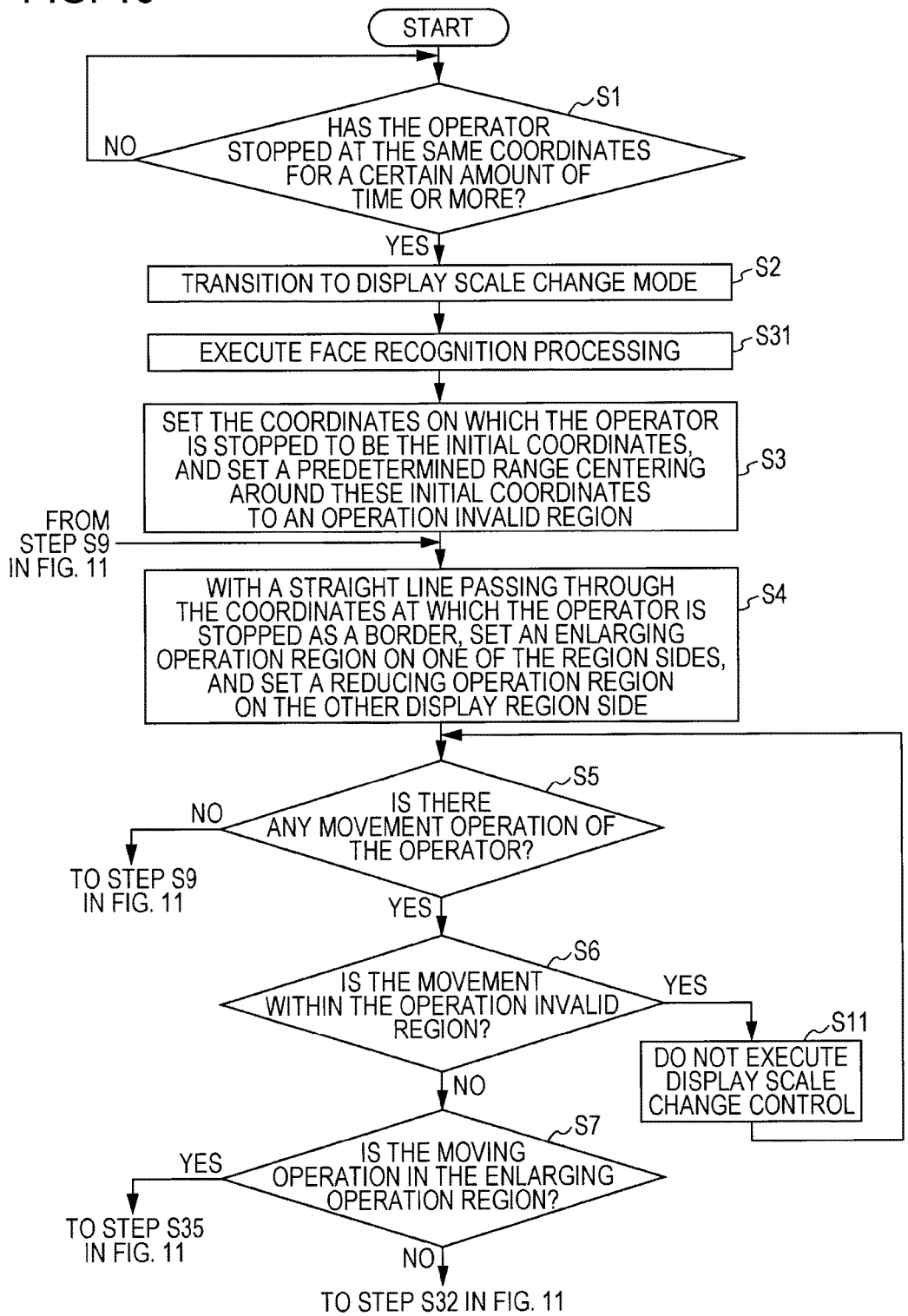
FIG. 10 is a flowchart to describe the first half of display scale change processing actions of a display item on a cellular phone serving as a third embodiment and the first half of display scale change processing actions of a camera through image on a cellular phone serving as an eighth embodiment of the present disclosure.
Figure 11:
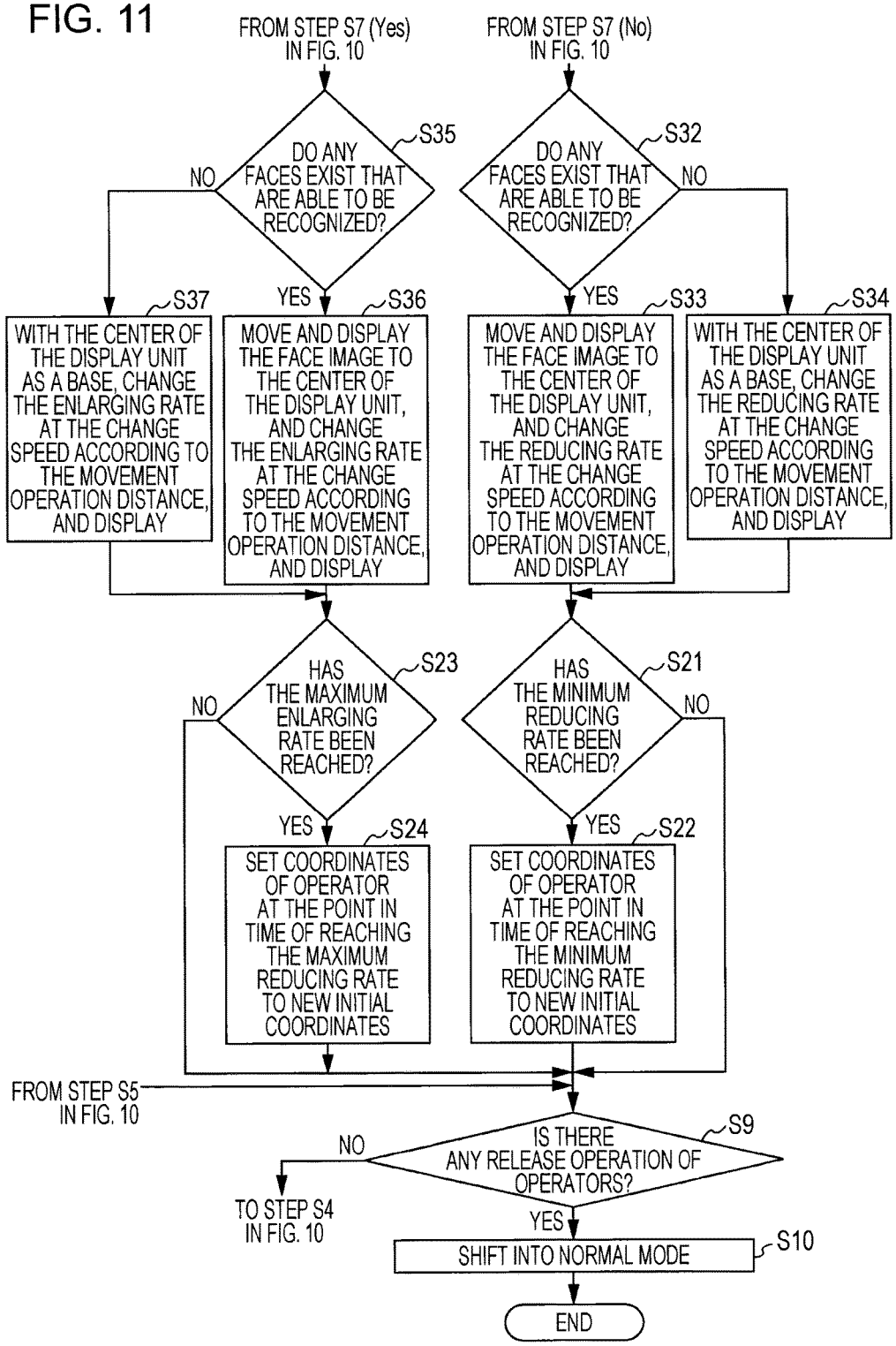
FIG. 11 is a flowchart to describe the second half of display scale change processing actions of a display item on a cellular phone serving as the third embodiment and the second half of display scale change processing actions of a camera through image on a cellular phone serving as the eighth embodiment of the present disclosure.

FIG. 10 shows a flowchart of the first half of change processing actions of display scale of the cellular phone according to the third embodiment, and FIG. 11 shows a flowchart of the second half of change processing actions of display scale of the cellular phone according to the third embodiment.

In the flowcharts in FIG. 10 and FIG. 11, for the steps that perform the same processing as the steps in the flowchart in FIG. 2 used in the event of describing the cellular phone according to the first embodiment described above and the steps in the flowchart in FIG. 8 used in the event of describing the cellular phone according to the second embodiment described above, the same step numbers are appended as the steps in the flowchart in FIG. 2 and the flowchart in FIG. 8. Therefore, for detailed description of the steps other than the steps corresponding to the differences described below, the descriptions of the first embodiment described above or the descriptions of the second embodiment described above should be referenced, based on the step numbers.

Figure 12A:
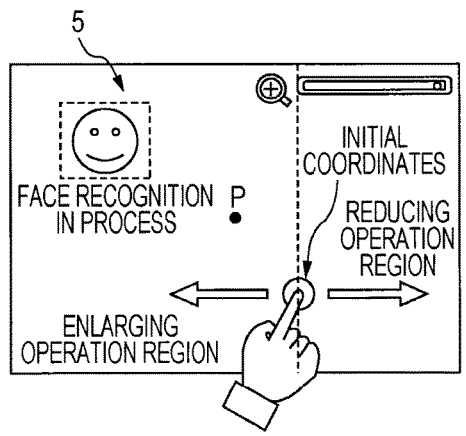
FIGS. 12A-12D are diagrams to describe enlarging operations of a display item on a cellular phone according to the third embodiment of the present disclosure.

First, in the flowchart in FIG. 10, upon transitioning to display scale change mode in step S2, the control unit 15 advances the processing to step S31. In step S31 herein, the control unit 15 performs recognition processing of a face image in a display item that is displayed on the display unit 5, as shown in FIG. 12A, based on the face recognition program stored in the memory 14 shown in FIG. 1.

Note that in this example, the description is advanced as the display processing program that performs display scale change processing and the face recognition program having been stored separately in the memory 14, but the face recognition program may be built into the display processing program as a program that is a part of the display processing program.

Next, in step S3 and step S4 as described above, the control unit 15 sets the initial coordinates, operation invalid region, enlarging operation region, and reducing operation region. In the case of detecting a movement operation of the operator in the enlarging operation region in step S7, the control unit 15 advances the processing to step S35 in the flowchart in FIG. 11, and in the case of detecting a movement operation of the operator in the reducing operation region in step S7 (i.e. in the case of determining No in step S7), the control unit 15 advances the processing to step S32 in the flowchart in FIG. 11.

Upon advancing the processing to step S35 in the flowchart in FIG. 11 by detecting a movement operation of the operator in the enlarging operation region, the control unit 15 determines whether or not a face has been able to be recognized from the display items currently displayed on the display unit 5 with the face recognition processing executed in step S31 above.

In the case of determining that a face has been able to be recognized, the control unit 15 advances the processing to step S36, and in the case of determining that a face has not been able to be recognized, advances the processing to step S37.

Figure 12B:
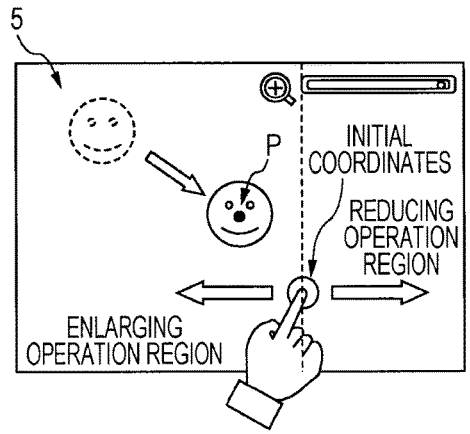

In step S36, the face has been able to be recognized, whereby the control unit 15 performs control so as to move and display the face image recognized as shown in FIG. 12B into the center P of the display unit 5. In other words, in this case, the control unit 15 matches the center of the face image and the center P of the display unit 5, and displays the face image on the display unit 5.

Figure 12C:
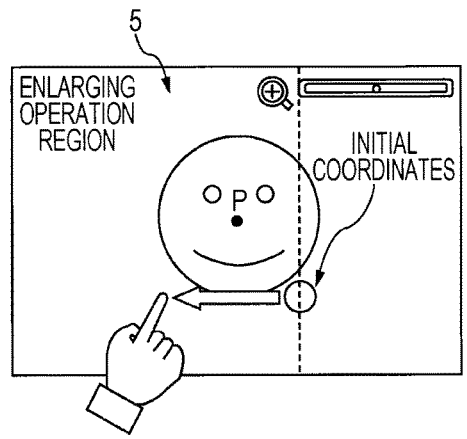
Figure 12D:
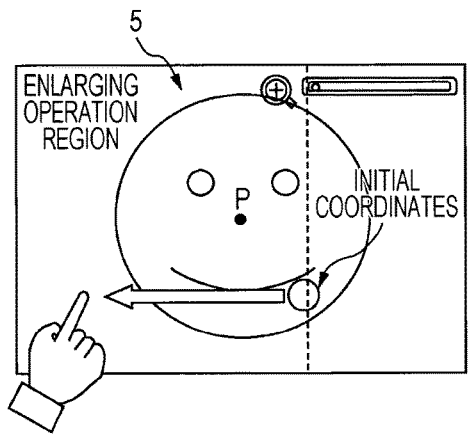

In step S36 the control unit 15 changes the display scale change speed according to the above-mentioned movement operation distance, and gradually enlarges the display item on the display unit 5, with the center P of the display unit 5 as a base thereof, so as to be at the changed display scale. Thus, the face image moved to the center P of the display unit 5 is displayed with a gradually larger display scale, according to the enlarging operation of the user, as shown in FIG. 12C and FIG. 12D. Upon performing such enlarging processing, the control unit 15 advances the processing to step S23.

Conversely, upon advancing the processing to step S37 by determining that the face has not be able to be recognized, a face image to move to the center P does not exist, whereby the control unit 15 performs enlarging processing of the display item with the center P of the display unit 5 as a base, as described above with the first embodiment and second embodiment, and advances the processing to step S23.

In step S23 and step S24, as described with the second embodiment, in the event that the face image or the like that has been subjected to enlarging processing is at the maximum enlargement scale, the control unit 15 sets new initial coordinates as to the coordinates of the operation position thereof and prepares for reducing operations thereafter. The description of the second embodiment should be referenced for details.

Next, upon advancing the processing to step S32 of the flowchart in FIG. 11 by detecting the movement operation of the operator in the reducing operation region, the control unit 15 determines in step S7 of the flowchart in FIG. 10 whether or not a face has been able to be recognized from the display items currently displayed on the display unit 5 with the face recognition processing executed in step S31.

In the case of determining that a face has been able to be recognized, the control unit 15 advances the processing to step S33, and in the case of determining that a face has not been able to be recognized, advances the processing to step S34.

Figure 13A:
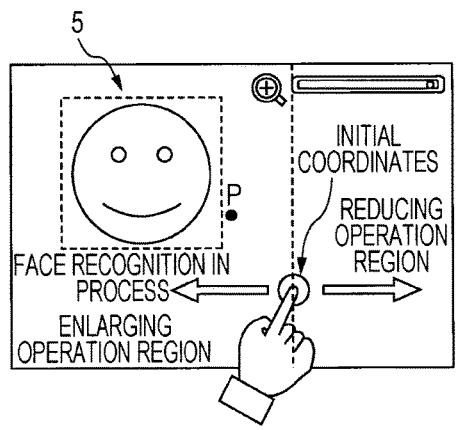
FIGS. 13A-13D are diagrams to describe reducing operations of a display item on a cellular phone according to the third embodiment of the present disclosure.
Figure 13B:
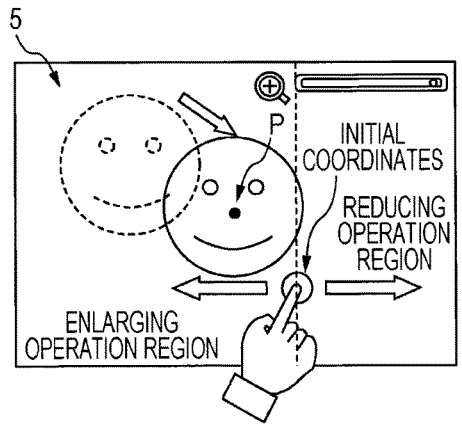

In step S33, the face has been able to be recognized, whereby the control unit 15 performs control to move and display the face image recognized as shown in FIG. 13A and FIG. 13B in the center P of the display unit 5. In other words, in this case, the control unit 15 matches the center of the face image and the center P of the display unit 5, and displays the face image on the display unit 5.

Figure 13C:
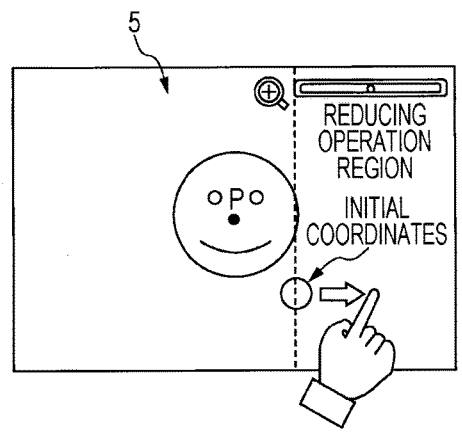
Figure 13D:
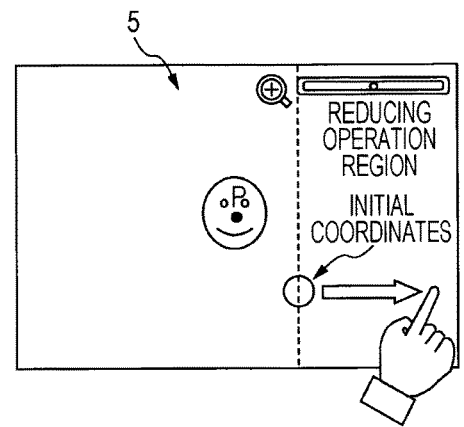

In step S33 the control unit 15 changes the display scale change speed according to the above-mentioned movement operation distance, and gradually reduces the display item on the display unit 5, with the center P of the display unit 5 as a base thereof, so as to be the changed display scale. Thus, the face image moved to the center P of the display unit 5 is displayed with a gradually smaller display scale, according to the reducing operation of the user, as shown in FIG. 13C and FIG. 13D. Upon performing such reducing processing, the control unit 15 advances the processing to step S21.

Conversely, upon advancing the processing to step S34 by determining that the face has not be able to be recognized, a face image to move to the center P does not exist, whereby the control unit 15 performs reducing processing of the display item with the center P of the display unit 5 as a base, as described above with the first embodiment and second embodiment, and advances the processing to step S21.

In step S21 and step S22, as described with the second embodiment, in the event that the face image or the like that has been subjected to reducing processing is at the minimum reduction scale, the control unit 15 sets new initial coordinates as to the coordinates of the operation position thereof and prepares for enlarging operations thereafter. The description of the second embodiment should be referenced for details.

[Advantages of Third Embodiment]

As is clear from the above description, with the cellular phone according to the third embodiment of the present disclosure, upon transitioning to display scale change mode, a face image in the display image displayed on the display unit 5 is subjected to recognition processing. In the case of recognizing the face image, with this cellular phone, after having moved the recognized face image to the center P of the display unit 5, the display image of the display unit 5 is gradually enlarged or reduced, with the center P of the display unit 5 as a base.

Thus, in the case that a face image exists in the display image displayed on the display unit 5, the face image is automatically displayed at the center P of the display unit 5, after which enlarging processing or reducing processing can be performed, and the same advantages of the above-described embodiments can be obtained.

[Fourth Embodiment]

Next, a cellular phone according to a fourth embodiment to which the present disclosure has been applied will be described.

In the case of the cellular phone in the third embodiment described above, the recognized face image is moved to the center of the display unit 5 to perform enlarging processing or reducing processing. Conversely, with the cellular phone in the fourth example described below, the entire display item is moved so that the location corresponding to the coordinates operated by touch by the user is positioned at the center P of the display unit 5, after which enlarging processing or reducing processing is performed.

Note that the cellular phone according to the third embodiment described above and the cellular phone according to the fourth embodiment described below differ only in this point. Therefore, in the description of the cellular phone according to the fourth embodiment, description of only this difference will be made, and duplicative descriptions will be omitted.

Figure 14:
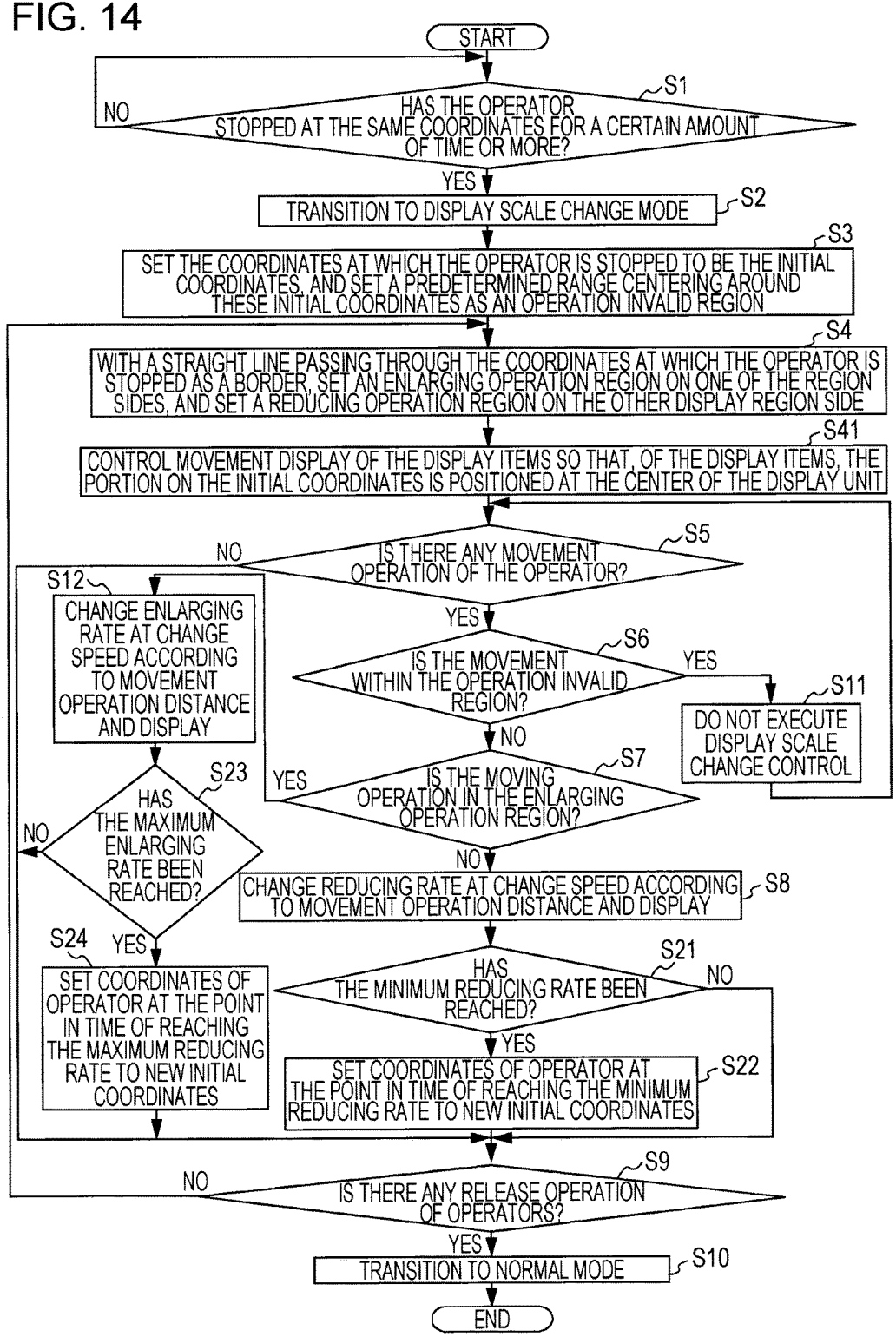
FIG. 14 is a flowchart to describe display scale change processing actions of a display item on a cellular phone according to a fourth embodiment and display scale change processing actions of a camera through image on a cellular phone serving as a ninth embodiment of the present disclosure.

FIG. 14 shows a flowchart of the display scale change processing actions according to the fourth embodiment.

In the flowchart in FIG. 14, for the steps that perform the same processing as the steps in the flowchart in FIG. 2 used in the event of describing the cellular phone according to the first embodiment described above and the steps in the flowchart in FIG. 8 used in the event of describing the cellular phone according to the second embodiment described above, the same step numbers are appended as the steps in the flowchart in FIG. 2 and the flowchart in FIG. 8. Therefore, for detailed description of the steps other than the steps corresponding to the differences described below, the descriptions of the first embodiment described above or the descriptions of the second embodiment described above should be referenced, based on the step numbers.

First, in the case of the cellular phone according to the fourth embodiment, the user operates, by touch with an operator such as a finger, a location on the entire display region of the display unit 5 on which a display item is displayed, that is desired to be the center of enlarging operations or reducing operations (the location desired to be the center of enlarging operations or reducing operations).

Figure 15A:
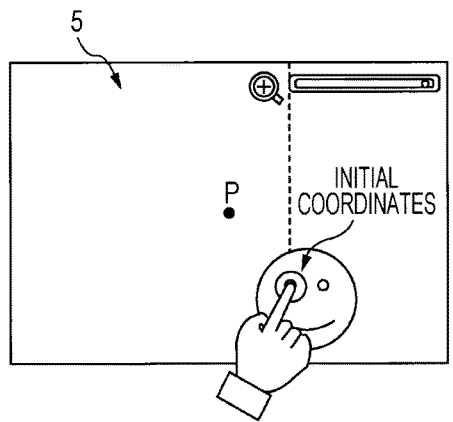
FIGS. 15A-15D are diagrams to describe enlarging operations of a display item on a cellular phone according to the fourth embodiment of the present disclosure.
Figure 16A:
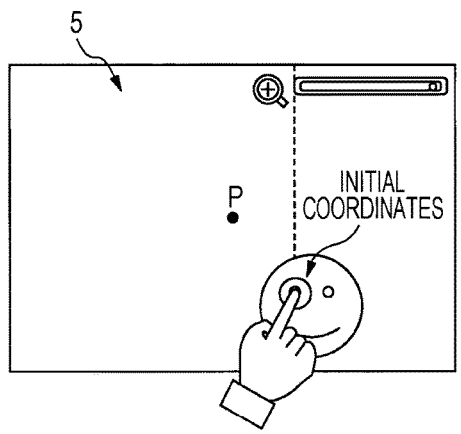
FIGS. 16A-16D are diagrams to describe reducing operations of a display item on a cellular phone according to the fourth embodiment of the present disclosure.

Upon this touching operation being performed, the control unit 15 transitions to display scale change mode in step S1 and step S2 in the flowchart in FIG. 14, and in step S3 and step S4, sets the coordinates of the location touched and operated with the operator as shown in FIG. 15A and FIG. 16A as the initial coordinates, while performing settings of the invalid operation region and enlarging operation region and so forth.

That is to say, in the case of the cellular phone in the fourth example, the location of the initial coordinates becomes the location specified by the user as the center of the enlarging operation or reducing operations.

Figure 15B:
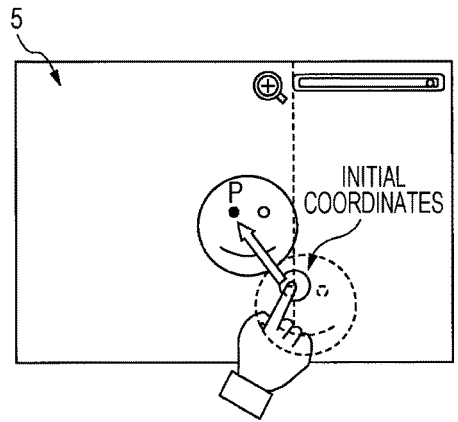
Figure 16B:
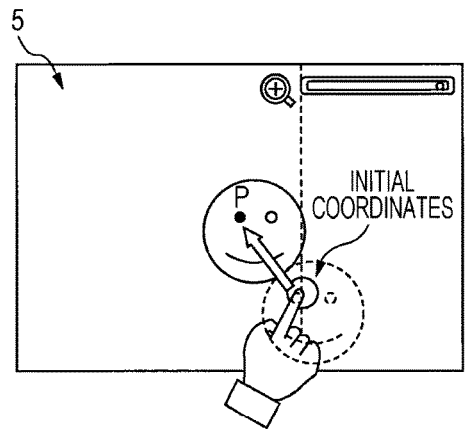

Next, in step S41 in the flowchart in FIG. 14, the control unit 15 performs control so as to move and display, of the display image displayed on the display unit 5, the display image so as to position the portion of the initial coordinates on the center P of the display unit 5, as shown in FIG. 15B and FIG. 16B.

That is to say, in this step S41, the control unit 15 performs control so as to move and display the entire display image so that the portion corresponding to the initial coordinates which is the location specified by the user as a location which is desired to be in the center of the enlarging operation or the reducing operation is positioned at the center P of the display unit 5.

Next, in step S7 in the flowchart in FIG. 14, upon detecting a movement operation in the enlarging operation region, the control unit 15 advances the processing to step S12, and subjects the display item displayed on the display unit 5 to enlarging processing so as to be at the display scale changed at the speed corresponding to the movement operation distance in the enlarging operation region, with the center P as a base.

Figure 15C:
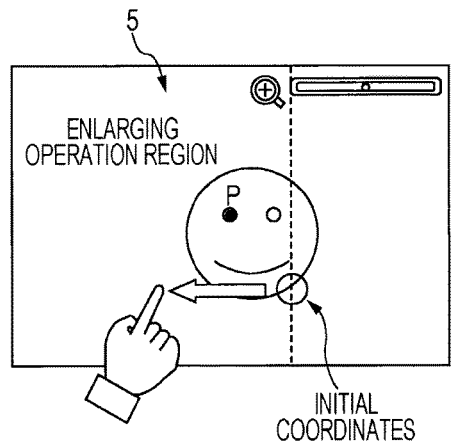
Figure 15D:
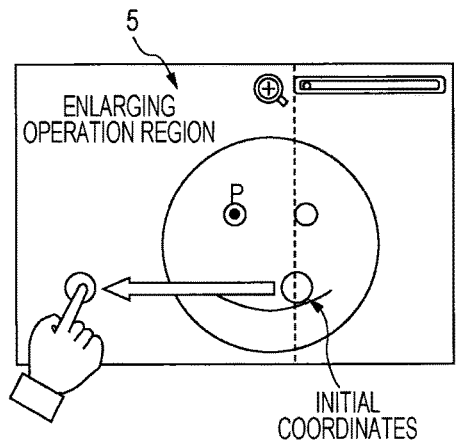

Thus, as shown in FIG. 15C and FIG. 15D, the display item is gradually enlarged according to the enlarging operation of the user, with the portion moved to the center P of the display unit 5 as a base. Upon performing such enlarging processing, the control unit 15 advances the processing to step S23.

In step S23 and step S24, as described with the second embodiment, in the event that the display item that is subject to enlarging processing is at the maximum enlargement scale, the control unit 15 sets new initial coordinates as to the coordinates of the operation position, and prepares for reducing operations thereafter. The description of the second embodiment should be referenced for details.

Conversely, in step S7 in the flowchart in FIG. 14, upon detecting a movement operation in the reducing operation region, the control unit 15 advances the processing to step S8, and subjects the display item displayed on the display unit 5 to reducing processing so as to be at the display scale changed at the speed corresponding to the movement operation distance in the reducing operation region, with the center P as a base.

Figure 16C:
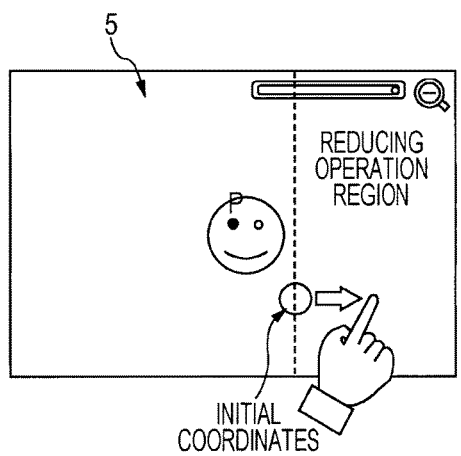
Figure 16D:
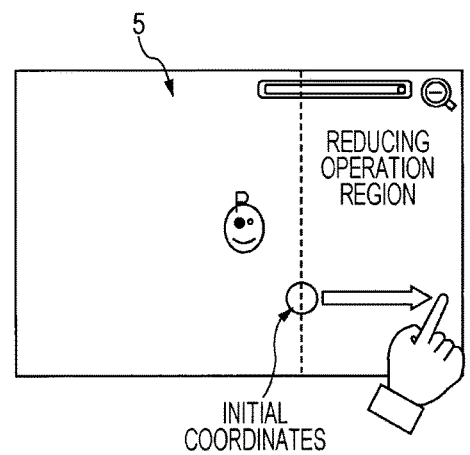

Thus, as shown in FIG. 16C and FIG. 16D, the display item is gradually reducing according to the reducing operation of the user, with the portion moved to the center P of the display unit 5 as a base. Upon performing such reducing processing, the control unit 15 advances the processing to step S21.

In step S21 and step S22, as described with the second embodiment, in the event that the display item that is subject to reducing processing is at the minimum reduction scale, the control unit 15 sets new initial coordinates as to the coordinates of the operation position, and prepares for enlarging operations thereafter. The description of the second embodiment should be referenced for details.

[Advantages of Fourth Embodiment]

As is clear from the above description, with the cellular phone according to the fourth embodiment of the present disclosure, the location on the display unit 5 which the user touches to operate in the event of transitioning to display scale change mode is set as initial coordinates, while the display item which is displayed on the display unit 5 is controlled so as to be moved and displayed so that the touched location is positioned at the center of the display unit 5.

Subsequently, according to enlarging operations or reducing operations performed by the user, the display item is subjected to enlarging processing or reducing processing, with the center of the display unit 5 as a base.

Thus, after displaying the location specified by the user with touching operations at the center P of the display unit 5, the entire display item can be subjected to enlarging processing or reducing processing, and also the same advantages described above with the embodiments can be obtained.

[Fifth Embodiment]

Next, a cellular phone according to a fifth embodiment to which the present disclosure is applied will be described.

In the case of the cellular phone in the fourth embodiment described above, enlarging processing or reducing processing of a display item is performed with the location corresponding to coordinates that the user touches to operation as the center. Conversely, with the cellular phone according to the fifth embodiment to be described below, enlarging processing or reducing processing of a display item is performed with an object, which has been touched and operated by the user, as the center.

Note that the cellular phone according to the fourth embodiment described above and the cellular phone according to the fifth embodiment described below differ only in this point. Therefore, in the description of the cellular phone according to the fifth embodiment, only the difference will be described, and duplicative descriptions will be omitted.

Figure 17:
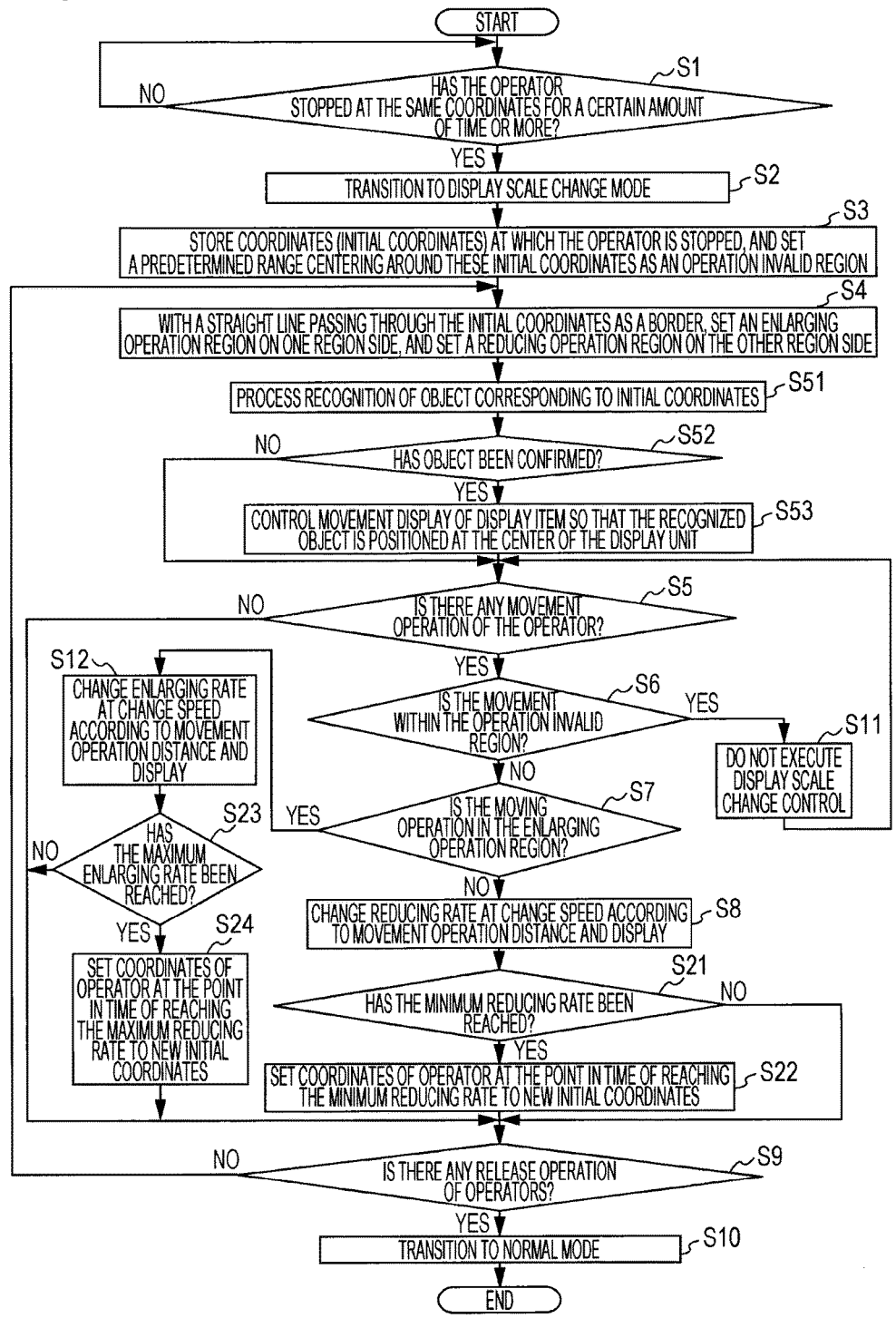
FIG. 17 is a flowchart to describe change processing actions of display scale of a display item on a cellular phone serving as a fifth embodiment and display scale change processing actions of a camera through image on a cellular phone serving as a tenth embodiment of the present disclosure.

FIG. 17 shows a flowchart of display scale change processing actions of the cellular phone according to the fifth embodiment herein.

In the flowchart in FIG. 17, for the steps that perform the same processing as the steps in the flowchart in FIG. 2 used in the event of describing the cellular phone according to the first embodiment described above and the steps in the flowchart in FIG. 8 used in the event of describing the cellular phone according to the second embodiment described above, the same step numbers are appended as the steps in the flowchart in FIG. 2 and the flowchart in FIG. 8. Therefore, for detailed description of the steps other than the steps corresponding to the differences described below, the descriptions of the first embodiment described above or the descriptions of the second embodiment described above should be referenced, based on the step numbers.

First, in the case of the cellular phone according to the fifth embodiment, the user touches with an operator such as a finger to operate an object, out of all the display items displayed on the display unit 5, which is desired to be the center of the enlarging processing or reducing processing.

Upon the touching operation having been performed, the control unit 15 transitions to display scale change mode in step S1 and step S2 in the flowchart in FIG. 17, and in step S3 and step S4 sets the coordinates of the location operated by touch with an operator as initial coordinates, while performing settings of the invalid operation region and enlarging operation region and so forth.

Figure 18A:
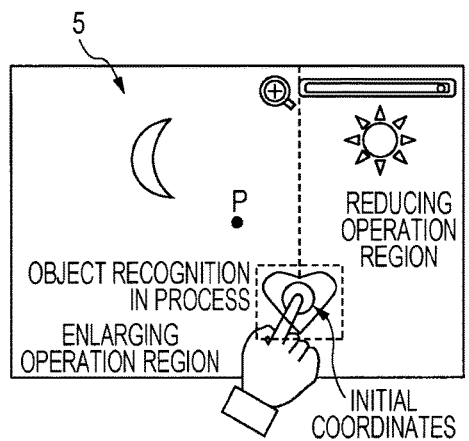
FIGS. 18A-18D are diagrams to describe enlarging operations of a display item on a cellular phone according to the fifth embodiment of the present disclosure.
Figure 19A:
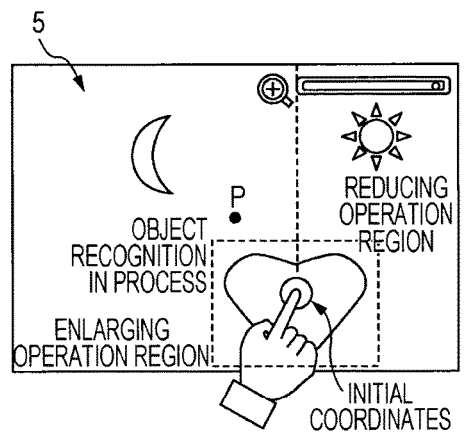
FIG. 19A-19D are diagrams to describe reducing operations of a display item on a cellular phone according to the fifth embodiment of the present disclosure.

Next, the control unit 15 advances the processing to step S51 in the flowchart in FIG. 17, and as shown in FIG. 18A and FIG. 19A, subjects the object corresponding to the initial coordinates to recognition processing, and advances the processing to step S52.

In step S52, the control unit 15 determines whether or not an object corresponding to the initial coordinates has been able to be recognized, and in the case of determining that the object has been able to be recognized, advances the flow to step S53, and in the case of determining that the object has not been able to be recognized, skips the processing in step S53 and advances the processing to step S5.

Figure 18B:
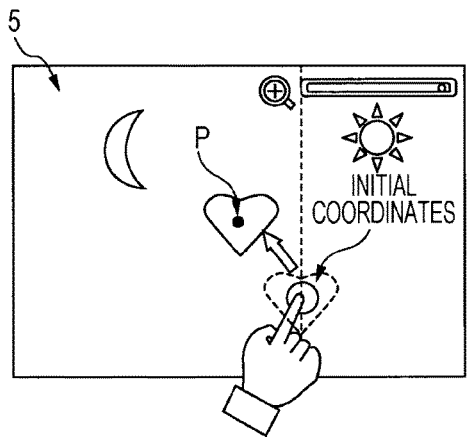
Figure 19B:
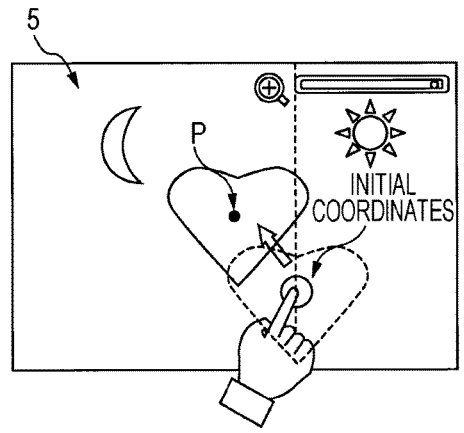

Upon advancing the processing to step S53 by determining that the object corresponding to the initial coordinates has been able to be recognized, the control unit 15 performs control to move and display the recognized object so that the center of the recognized object and the center P of the display unit 5 match, as shown in FIG. 18B and FIG. 19B.

That is to say, in the case of the cellular phone according to the fifth embodiment, the control unit 15 recognizes an object displayed at a location on the display unit 5 that has been operated by touch by the user, and moves and displays this object at the center of the display unit 5.

Next, in step S7 in the flowchart in FIG. 17 herein, upon detecting a movement operation in the enlarging operation region, the control unit 15 advances the processing to step S12, and subjects the display item displayed on the display unit 5 to enlarging processing so as to be the display scale changed at the speed corresponding to the movement operation distance in the enlarging operation region, with the center P as a base.

Figure 18C:
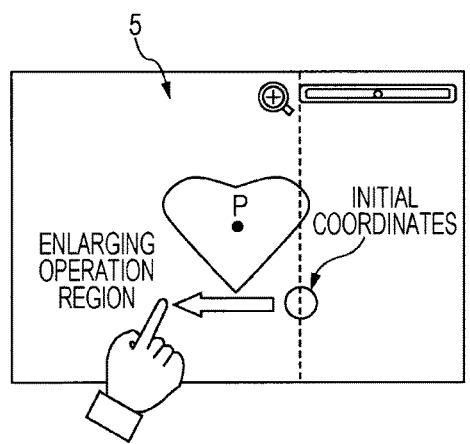
Figure 18D:
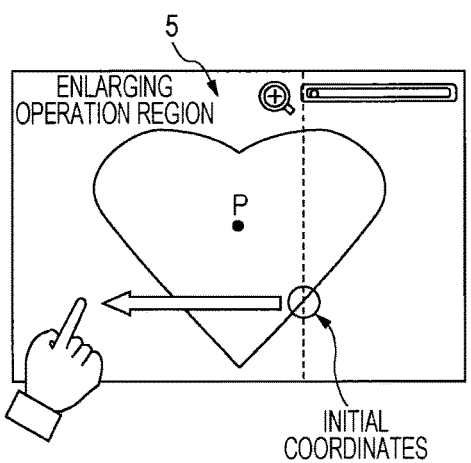

Thus, in the case that an object corresponding to the initial coordinates is recognized, the display item is gradually enlarged according to the enlarging operation of the user, with the object moved to the center P of the display unit 5 as a base, as shown in FIG. 18C and FIG. 18D.

Also, in the case that an object corresponding to the initial coordinates is not recognized, the display item is gradually enlarged according to the enlarging operation of the user, with the center P of the display unit 5 as a base.

Upon performing such enlarging processing, the control unit 15 advances the processing to step S23.

In step S23 and step S24, as described with the second embodiment, in the event that the display item subjected to enlarging processing is at the maximum enlargement scale, the control unit 15 sets new initial coordinates as to the coordinates of the operation position thereof, and prepares for reducing operations thereafter. The description of the second embodiment should be referenced for details.

Next, in step S7 in the flowchart in FIG. 17, upon advancing the processing to step S8 by detecting movement operation in the reducing operation region, the control unit 15 subjects the display item displayed on the display unit 5 to reducing processing so as to be the display scale changed at the speed corresponding to the movement operation distance in the reducing operation region, with the center P as a base.

Figure 19C:
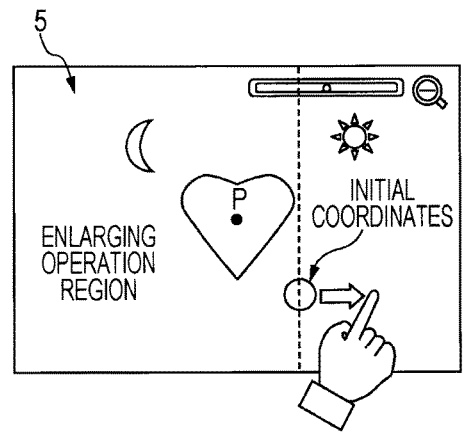
Figure 19D:
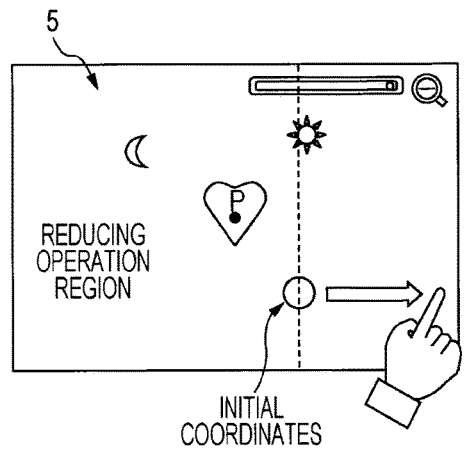

Thus, in the case that an object corresponding to the initial coordinates is recognized, the display item is gradually reduced according to the reducing operation of the user, with the object moved to the center P of the display unit 5 as a base, as shown in FIG. 19C and FIG. 19D.

Also, in the case that an object corresponding to the initial coordinates is not recognized, the display item is gradually reduced according to the reducing operation of the user, with the center P of the display unit 5 as a base.

Upon performing such reducing processing, the control unit 15 advances the processing to step S21.

In step S21 and step S22, as described with the second embodiment, in the event that the display item subjected to reducing processing is at the minimum reduction scale, the control unit 15 sets new initial coordinates as to the coordinates of the operation position thereof, and prepares for enlarging operations thereafter. The description of the second embodiment should be referenced for details.

[Advantages of Fifth Embodiment]

As is clear from the above description, with the cellular phone according to the fifth embodiment of the present disclosure, an object displayed at the location on the display unit 5 which the operator touches to operate in the event of transitioning to display scale change mode is recognized, and the display item which is displayed on the display unit 5 is controlled so as to be moved and displayed so that the object is positioned at the center of the display unit 5.

Subsequently, according to enlarging operations or reducing operations performed by the user, the display item is subjected to enlarging processing or reducing processing, with the center of the display unit 5 as a base.

Thus, after displaying the object specified by the user with touching operations at the center P of the display unit 5, the entire display item can be subjected to enlarging processing or reducing processing, and also the same advantages described above with the embodiments can be obtained.

[Sixth Embodiment]

The first embodiment through fifth embodiment described above have been display scale change processing actions based on the display processing program for change control of display scale of a display item displayed on the display unit 5.

Conversely, the sixth embodiment through tenth embodiment described below are of an example to which the present disclosure is applied, to imaging scale change control functions of a camera control program stored in the memory 14.

Descriptions will be made in order from the cellular phone according to the sixth embodiment. In the case of the cellular phone according to the sixth embodiment, when a camera unit 8 is started and operated, the control unit 15 performs imaging control of still images and moving pictures, based on the camera control program stored in the memory 14.

The control unit 15 performs control to sequentially display the imaging images that have been imaged with the camera on the display unit 5. Thus, the imaging images that are currently imaged on the camera unit 8 are displayed as moving pictures on the display unit 5 (camera through images).

The user measures the operating timing of a shutter button while viewing such a camera through image, and operates the shutter button at a timing wherein a desired camera through image is displayed on the display unit 5.

The control unit 15 displays the camera through image on the display unit 5 while monitoring the existence or not of a shutter button operation by the user. At the timing that the shutter button is operated by the user, the imaging image that has been imaged with the camera unit 8 is saved in the memory 14.

Note that in the case of moving pictures, the imaging images that have been imaged with the camera unit 8 from the time the shutter button is first operated until the next time the shutter button is operated is saved in the memory 14.

Now, as for imaging images saved in the memory 14 at the timing that the shutter button is operated, imaging images corresponding to the display scale of the camera through image displayed on the display unit 5 are saved in the memory 14.

That is to say, "the display scale of the camera through image is the imaging scaling of the imaging image". With the cellular phone herein according to the sixth embodiment, the user touches a desired location on the display unit 5 on which the camera through image is displayed with an operator such as a finger or the like, and by a sliding operation of the touching finger, the change operation is performed of the display scale of the camera through image displayed on the display unit 5, enabling imaging scale change operations of the imaging image saved in the memory 14 via the display scale change operation of the camera through image.

A flow of change processing of such camera through image display scale (i.e. imaging scaling) is shown in the flowchart in FIG. 2. Upon starting operations of the camera unit 8 being performed by the user, the control unit 15 of the cellular phone displays the camera through image on the display unit 5 based on the camera control program stored in the memory 14, and starts the processing shown in the flowchart in FIG. 2.

In step S1, the control unit 15 monitors whether or not there is any predetermined operations for specifying a display scale change operation of the camera through image that is displayed on the display unit 5.

As an example, with the cellular phone according to this example, in the case of specifying display scale changes to the camera through image, the user operates by touching, with an operator such as a finger or the like, an optional location on the display unit 5, while the camera through image is displayed on the display unit 5, and waits for a certain amount of time to pass while continuing to touch with this finger (long-pressing operation).

Upon detecting a long-pressing operation at the same location on the display unit 5 based on measurement information of the timer 10, the control unit 15 advances the processing to step S2, and transitions to camera through image display scale change mode.

Note that in this example, the operation that serves as a trigger for the control unit 15 to transition to camera through image display scale change mode is a long-pressing operation at the same location on the display unit 5, but the control unit 15 may transition to display scale change mode in the event of detecting a touching operation at any location on the display unit 5. Alternatively, the control unit 15 may transition to display scale change mode in the event of detecting a predetermined sliding operation as to the display unit 5.

Further, an arrangement may be made to transition to camera through image display scale change mode in the event that the user operates a shutter button for longer than a predetermined amount of time. In this case, the control unit 15 detects the continuous operation time of the shutter button based on the measurement information of the timer 10, and transitions to camera through image display scale change mode in the event that the continuous operating time herein is a predetermined amount of time or longer.

Next, upon transitioning to camera through image display scale change mode, in step S3 the control 15 stores the coordinates on the display unit 5 at which the finger of the user is stopped as initial coordinates in the memory 14, while setting a predetermined range centering around the initial coordinates as an operation invalid region wherein display scale change operations by the user are invalid, and advances the processing to step S4 (see FIG. 3).

In step S4, with a straight line passing through the initial coordinates as a border, the control unit 15 sets an enlarging operation region for accepting enlarging operations on one of the display region sides, while setting a reducing operation region for accepting reducing operations on the other display region side, and advances the processing to step S5 (see FIG. 3, FIG. 4A, and FIG. 4B).

Next, although an example, with the cellular phone herein, in the case of performing enlarging operations of the camera through image, the user operates by moving an operator such as a finger or the like, which is touching and stopped at a position on the display unit 5 corresponding to the initial coordinates, to the enlarging operation region.

Also, with the cellular phone herein, in the case of performing reducing operations of the camera through image, the user operates by moving an operator such as a finger or the like, which is touching and stopped at a position on the display unit 5 corresponding to the initial coordinates, to the reducing operation region.

In step S5 of the flowchart in FIG. 2, the control unit 15 monitors whether or not there is any movement of the operator which is stopped on the initial coordinates. That is to say, the control unit 15 detects transfer of coordinates at the touching operation position on the display unit 5, and based thereupon, determines the movement operation direction of the operator and the operating region. In step S5, in the case of detecting a movement operation of the operator, the control unit 15 advances the processing to step S6, and in the case of not detecting a movement operation of the operator, advances the processing to step S9.

If the processing is advanced to step S9 without detecting a movement operation of the operator, the control unit 15 determines whether or not there has been a release operation of the operator, which separates the operator touching the display unit 5 from the display unit 5.

With this cellular phone, in the case of stopping the display scale change operation of the camera through image, the user separates the operator such as a finger or the like that is touching the display unit 5 from the display unit 5. Therefore, upon detecting the release operation of the operator, the control unit 15 recognizes that stopping instructions have been given for the display scale change operation of the camera through image by the user, and advances the processing to step S10. In step S10, the control unit 15 returns the mode of the control unit 15 from the camera through image display scale change mode to a normal mode, which is a mode that enables generating operations such as imaging a subject using the camera unit 8 or the like, for example, and ends the entire processing shown in the flowchart in FIG. 2 herein.

Conversely, upon advancing the processing to step S6 by detecting the movement operation of the operator, the control unit 5 determines whether or not the region on the display unit 5 in which the movement operation is performed by the user is within the operation invalid region.

In the case that the operator is positioned within the operation invalid region, the control unit 15 advances the processing to step S11, and does not perform display scale change processing of the camera through image. Therefore, the control unit 15 waits for the operator to be positioned outside of the invalid operation region, and advances the processing to step S7.

In step S7, the control unit 15 determines whether or not the operator is currently positioned in the enlarging operation region, based on the current coordinates of the operator. In the case of determining that the operator is currently positioned in the enlarging operation region, the control unit 15 advances the processing to step S12.

In step S12, the control unit 15 detects the distance between the current operating position on the enlarging operation region and the position corresponding to the initial coordinates, and changes the display scale at the speed according to this distance, while enlarging and displaying the camera through image displayed on the display unit 5 at the changed display scale, and advances the processing to step S9.

Note that the control unit 15 performing variable control of a linear display scale change speed as described using FIG. 5A, or varying the display scale change speed step by step as described using FIG. 5B, is as described above.

Also, in the case of performing enlarging processing of the camera through image, the control unit 15 performs interpolating processing or the like of image data as to the camera through image that is subject to enlarging processing, thereby performing so-called digital camera through image enlarging processing, and displays this on the display unit 5.

In this example, enlarging processing of the camera through image is performed digitally, but enlarging processing of the camera through image may be performed by movement control of the zoom lens provided on the camera unit 8, thereby optically enlarging the subject image irradiated in the imaging device.

Further, in the case of performing enlarging processing of a camera through image optically up to a predetermined enlargement scale, and further performing enlarging processing more than the predetermined enlargement scale herein, the camera through image may be enlarged digitally as described above (i.e. concurrent use of optical zoom and digital zoom).

Next, in step S9, upon the control unit S9 determining whether or not there is a release operation of the above-described operator, and determination is made that there has been a release operation, in step S10 the mode of the control unit 15 is returned to normal mode from display scale change mode, and the entire processing shown in the flowchart in FIG. 2 is ended.

Also, in step S9, if determination is made that a release operation has not been made, this means that operation with the operator continues to be performed, whereby the control unit 15 returns the processing to step S5, and again monitors whether or not there is any movement operation of the operator.

In the case of the cellular phone according to this embodiment, by the control unit 15 returning to normal mode, shutter button operations are enabled. Therefore, the user enlarges the camera through image to the desired size in display scale change mode, and by performing a release operation returns the control unit 15 to normal mode, and performs operation of the shutter button. Upon the shutter button being operated, the control unit 15 performs control to save the imaging image of the subject imaged with the camera unit 8 at the timing of the shutter button being operated in the memory 14.

Thus, the imaging image of a subject corresponding to the enlargement scale of the camera through image enlarged to the desired size in display scale change mode can be saved in the memory 14.

On the other hand, determining in step S6 and step S7 that the operator is currently positioned outside the operation invalid region and outside the enlarging operation region means that the operator is currently positioned in the reducing operating region.

Therefore, in the case of determining in step S7 that the operator is currently positioned outside the enlarging operating region, the control unit 15 advances the processing to step S8, and detects the distance between the current operating position in the reducing operation region and the position corresponding to the initial coordinates based on the coordinates of the operator in the reducing operation region and the initial coordinates, and changes the display scale at the speed according to this distance, while reducing the camera through image displayed on the display unit 5, and advances the processing to step S9.

Note that the control unit 15 performing variable control of a linear display scale change speed as described using FIG. 5A, or varying the display scale change speed step by step as described using FIG. 5B, is as described above.

Also, in the case of performing reducing processing of the camera through image, the control unit 15 performs interpolating processing or the like of image data as to the camera through image that is subject to reducing processing, thereby performing so-called digital camera through image reducing processing, and displays this on the display unit 5.

In this example, reducing processing of the camera through image is performed digitally, but reducing processing of the camera through image may be performed by movement control of the zoom lens provided on the camera unit 8, thereby optically reducing the subject image irradiated in the imaging device.

Further, in the case of performing reducing processing of a camera through image optically up to a predetermined reduction scale, and further performing reducing processing more than the predetermined reduction scale herein, the camera through image may be reduced digitally (i.e. concurrent use of optical zoom and digital zoom).

Next, in step S9, upon the control unit S9 determining whether or not there is a release operation of the above-described operator, and determination is made that there has been a release operation, in step S10 the mode of the control unit 15 is returned to normal mode from display scale change mode, and the entire processing shown in the flowchart in FIG. 2 is ended.

Also, in step S9, if determination is made that a release operation has not been made, this means that operation with the operator continues to be performed, whereby the control unit 15 returns the processing to step S5, and again monitors whether or not there is any movement operation of the operator.

In the case of the cellular phone according to this embodiment, by the control unit 15 returning to normal mode, shutter button operations are enabled. Therefore, the user reduces the camera through image to the desired size in display scale change mode, and by performing a release operation returns the control unit 15 to normal mode, and performs operation of the shutter button. Upon the shutter button being operated, the control unit 15 performs control to save the imaging image of the subject imaged with the camera unit 8 at the timing of the shutter button being operated in the memory 14.

Thus, the imaging image of a subject corresponding to the reduction scale of the camera through image reduced to the desired size in display scale change mode can be saved in the memory 14.

Now, in the case of the cellular phone herein, the control unit 15 performs enlarging processing of the camera through image displayed on the display unit 5 until a release operation is detected in step S9, at a speed corresponding to the distance between the coordinates of the operator positioned in the enlarging operation region and the initial coordinates. Also, in the case of the cellular phone herein, the control unit 15 performs reducing processing of the camera through image displayed on the display unit 5 until a release operation is detected in step S9, at a speed corresponding to the distance between the coordinates of the operator positioned in the reducing operation region and the initial coordinates.

Therefore, if the user continues to position the operator in the enlarging operation region, or continues to position the operator in the reducing operation region, the control 15 performs variable control of the display scale change speed according to the operation distance, while continuously controlling the enlarging processing or reducing processing of the camera through image up to the maximum display scale or minimum display scale.

In the case of the cellular phone, in the case that stopping such enlarging processing or reducing processing of the camera through image is desired, the operator is returned to the operation invalid region or the operator is released from the display unit 5.

Whether or not the operator is positioned in the operation invalid region is determined by the control unit 15 in step S6 of the flowchart in FIG. 2. Upon determining that the operator is positioned in the operation invalid region in the event that the enlarging operation or reducing operation is performed, the control unit 15 advances the processing to step S11, and stops the enlarging operation or reducing operation.

Thus, the user performs movement operations in the enlarging operation region or reducing operation region, thereby changing the display scale of the camera through image displayed on the display unit 5, and moves the operator to the operation invalid region at a timing when the camera through image is displayed at a desired size, thereby stopping the enlarging processing or reducing processing, whereby the camera through image can be at the desired display scale.

Also, the case of releasing the operator from the display unit 5 is also the same. That is to say, the user performs display scale change operation of the camera through image displayed on the display unit 5, by moving in the enlarging operation region or reducing operation region, and releases the operator from the display unit 5 at a timing when the camera through image is displayed at a desired size. The control unit 15 detects the release operation in step S9 of the flowchart in FIG. 2, and stops the enlarging processing or reducing processing of the display item.

Thus, the user performs the release operation at the timing when the camera through image displayed on the display unit 5 is displayed at the desired size, whereby the enlarging processing or reducing processing of the camera through image is stopped and the camera through image can be at the desired display scale.

[Specific Example of Enlarging Operation]

Next, FIG. 20A through FIG. 20E show a display example of a camera through image corresponding to the enlarging operation of the user.

Figure 20A:
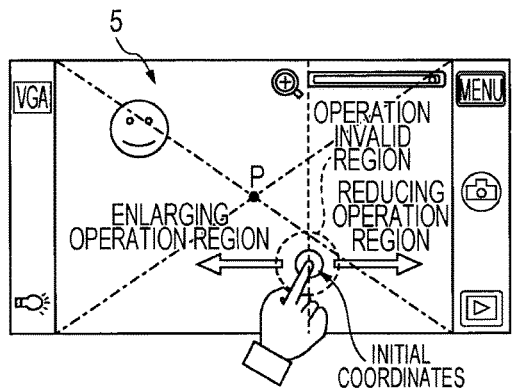
FIGS. 20A-20E are diagrams to describe enlarging operations of a display item on a cellular phone according to the sixth embodiment of the present disclosure.

First, while starting the camera control program, as shown in FIG. 20A, the user touches one location on the display unit 5 to operate, and when a certain amount of time has passed in the state of this touching operation, the control unit 15 transitions from standard mode to display scale change mode into display scale change mode, and sets the coordinates of the location that is touched as the initial coordinates.

Also, the control unit 15 sets the processing range centering around the initial coordinates as an operation invalid region (step S1 through step S3), as shown in FIG. 20A surrounded by a dotted circle.

Next, as shown by a dotted straight line in FIG. 20A, the display region of the display unit 5 is divided into left and right sides by a straight line (or a curved line may be used) passing through the initial coordinates, and one of the display regions is set as an enlarging operation region and the other display region is set as a reducing operation region (step S4).

Figure 20B:
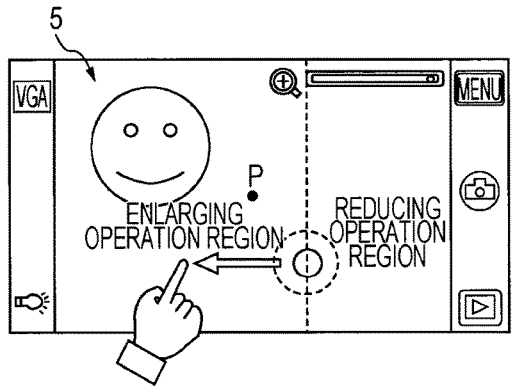

Next, the user moves the finger that is touching the position of the initial coordinates to the enlarging operation region in the state of touching the finger to the display unit 5, as shown in FIG. 20B. Upon this moving operation being performed, the control unit 15 waits for the finger of the user to move outside of the operation invalid region (step S6 and step S11), changes the camera through image display scale at a speed corresponding to the distance between the current operation position coordinates in the enlarging operation region and the initial coordinates (movement operation distance), and performs enlarging processing of the camera through image with the center P on the display unit 5 as a base (step S12), so as to be at the changed display scale.

Figure 20C:
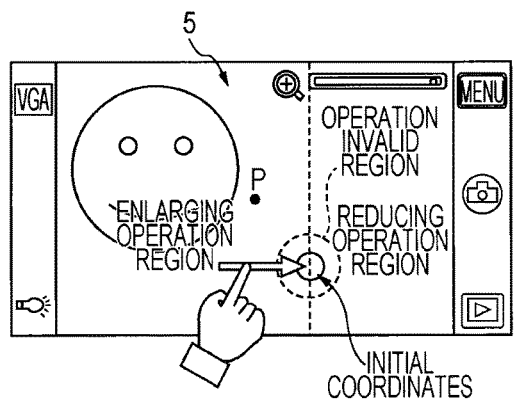

As shown in FIG. 20C, by the user returning the finger in the enlarging operation region to the direction of the initial coordinates and shortening the movement operation distance, the control unit 15 slows the display scale change speed of the camera through image in the amount that the movement operation distance has shortened, and continues the enlarging processing of the camera through image on which the center P on the display unit 5 is based, at the display scale changed by the slowed change speed.

Figure 20D:
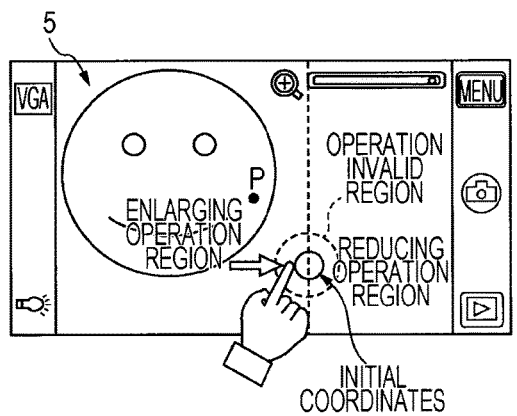

Next, in the event that the size of the camera through image enlarged and displayed on the display unit 5 is at the desired size, the user moves the finger that is touching to within the operation invalid region. Upon detecting that the finger of the user has moved into the operation invalid region, the control unit 15 performs control to stop the enlarging processing of the camera through image, as shown in FIG. 20D, and maintains the display scale of the display item displayed on the display unit 5 at the timing at which the finger of the user has moved into the operation invalid region (step S6 and step S11).

Note that in the case of the finger being positioned in the enlarging operation region again by the user moving the finger from the operation invalid region, the control unit 15 performs enlarging processing of the camera through image as described above.

Figure 20E:
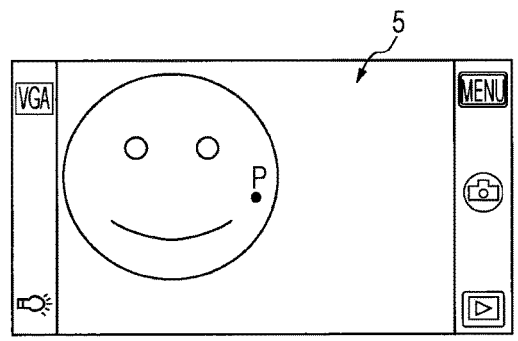

Conversely, in the event that the size of the camera through image is enlarged and displayed on the display unit 5 is at the desired size, in the case that the user performs a releasing operation to remove the finger that is touching from the display unit 5, the control unit 15 performs control to stop the enlarging processing of the camera through image, as shown in FIG. 20E. The control unit 15 then returns the information processing mode of the control unit 15 from display scale change mode to normal mode (step S9 and step S10).

Thus, the display unit 5 displays the camera through image that has been enlarged at the display scale when the user had performed a release operation. Upon the information processing mode of the control unit 15 returning to normal mode, shutter button operations and so forth are enabled. The control unit 15 confirms the subject image to be imaged with the camera through image displayed on the display unit 5, and operates the shutter button.

Upon detecting operation of the shutter button in normal mode, the control unit 15 digitally or optically processes the image data imaged with the camera unit 8, so as to be at the display scale displayed on the display unit 5 when the shutter button is pressed (in this case, enlargement scale), and saves this in the memory 14. The user can thus obtain image data corresponding to the enlargement scale adjusted with the display scale change mode.

[Specific Example of Reducing Operation]

Next, FIG. 21A through FIG. 21E show a display example of a camera through image corresponding to the reducing operation of the user.

Figure 21A:
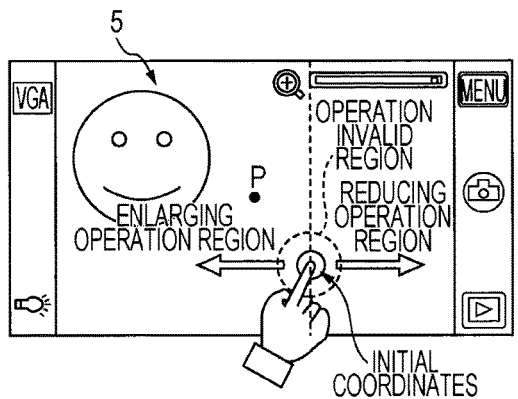
FIGS. 21A-21E are diagrams to describe reducing operations of a display item on a cellular phone according to the sixth embodiment of the present disclosure.

First, in starting the camera control program, as shown in FIG. 21A, the user touches one location on the display unit 5 to operate, and when a certain amount of time has passed in the state of this touching operation, the control unit 15 transitions from standard mode to display scale change mode into display scale change mode, and sets the coordinates of the location that is touched as the initial coordinates.

Also, the control unit 15 sets the processing range centering around the initial coordinates as an operation invalid region (step S1 through step S3), as shown in FIG. 21A surrounded by a dotted circle.

Next, as shown by a dotted straight line in FIG. 21A, the display region of the display unit 5 is divided into left and right sides by a straight line (or a curved line may be used) passing through the initial coordinates, and one of the display regions is set as an enlarging operation region and the other display region is set as a reducing operation region (step S4).

Figure 21B:
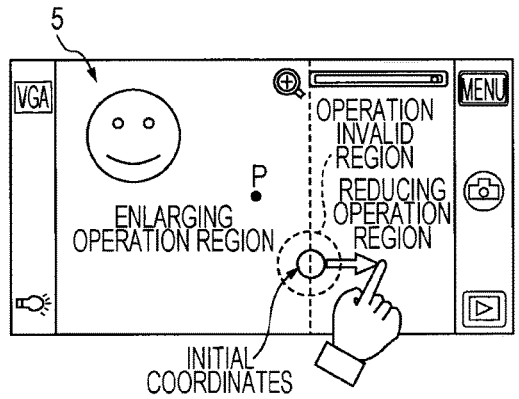
Figure 21C:
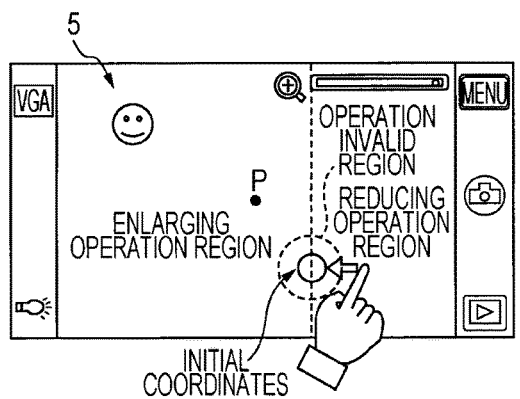

Next, the user moves the finger that is touching the position of the initial coordinates to the reducing operation region in the state of touching the finger to the display unit 5, as shown in FIG. 21B. Upon this moving operation being performed, the control unit 15 waits for the finger of the user to move outside of the operation invalid region (step S6 and step S11), changes the display scale at a speed corresponding to the distance between the current operation position coordinates in the reducing operation region and the initial coordinates (movement operation distance), and performs reducing processing of the camera through image with the center P on the display unit 5 as a base (step S12), so as to be at the changed display scale.

As shown in FIG. 20C, by the user returning the finger in the reducing operation region to the direction of the initial coordinates and shortening the movement operation distance, the control unit 15 slows the display scale change speed in the amount that the movement operation distance has shortened, and continues the reducing processing of the camera through image on which the center P on the display unit 5 is based, at the display scale changed by the slowed change speed.

Figure 21D:
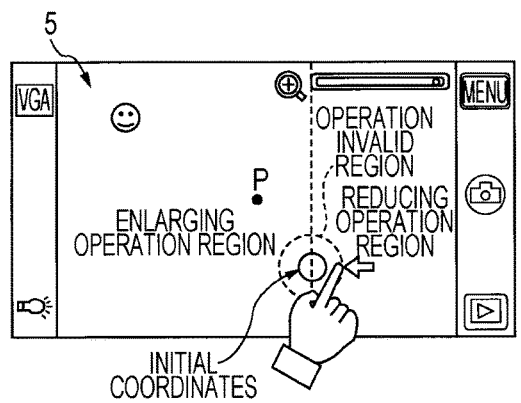

Next, in the event that the size of the camera through image reduced and displayed on the display unit 5 is at the desired size, the user moves the finger that is touching to within the operation invalid region. Upon detecting that the finger of the user has moved into the operation invalid region, the control unit 15 performs control to stop the reducing processing of the camera through image, as shown in FIG. 21D, and maintains the display scale of the camera through image displayed on the display unit 5 at the timing at which the finger of the user has moved into the operation invalid region (step S6 and step S11).

Note that in FIG. 15, in the case of the finger being positioned in the reducing operation region again by the user moving the finger from the operation invalid region, reducing processing of the camera through image is performed as described above.

Figure 21E:
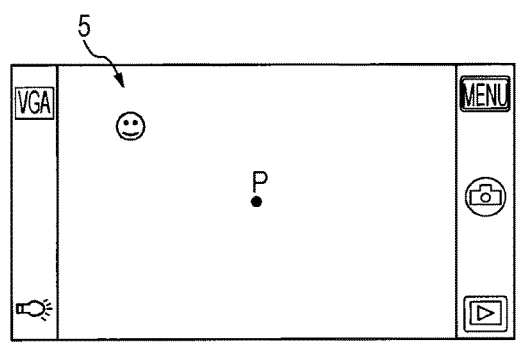

Conversely, in the event that the size of the camera through image is reduced and displayed on the display unit 5 at the desired size, in the case that the user performs a releasing operation to remove the finger that is touching from the display unit 5, the control unit 15 performs control to stop the reducing processing of the camera through image, as shown in FIG. 21E. The control unit 15 then returns the information processing mode of the control unit 15 from display scale change mode to normal mode (step S9 and step S10).

Thus, the display unit 5 displays the camera through image that has been reduced at the display scale when the user had performed a release operation. Upon the information processing mode of the control unit 15 returning to normal mode from display scale change mode, shutter button operations and so forth are enabled. The control unit 15 confirms the subject image to be imaged with the camera through image displayed on the display unit 5, and operates the shutter button.

Upon detecting operation of the shutter button in normal mode, the control unit 15, digitally as described above or optically as described above, so as to be at the display scale displayed on the display unit 5 when the shutter button is pressed (in this case, reduction scale), and saves this in the memory 14. The user can thus obtain image data corresponding to the reduction scale adjusted with the display scale change mode.

[Advantages of Sixth Embodiment]

As is clear from the above description, with the cellular phone according to the sixth embodiment of the present disclosure, upon a predetermined operation specifying the display scale change operation being performed, such as touching the same location on the display unit 5 for a certain amount of time or longer (long-pressing operation), for example, when starting up a camera control program, the control unit 15 sets the long-pressing location as initial coordinates, while setting an enlarging operation region for performing enlarging operations of a camera through image, and setting a reducing operation region for performing reducing operations of a camera through image, with the initial coordinates herein as a base.

In the case that the enlarging operation region is operated by the user, the control unit 15 performs control to change the display scale at a speed corresponding to the distance between the coordinates corresponding to the operation position on the enlarging operation region and the initial coordinates, while performing enlarging processing of the camera through image displayed on the display unit 5 so as to be at this changed display scale.

Also, in the case that the reducing operation region is operated by the user, the control unit 15 performs control to change the display scale at a speed corresponding to the distance between the coordinates corresponding to the operation position on the reducing operation region and the initial coordinates, while performing reducing processing of the camera through image displayed on the display unit 5 so as to be at this changed display scale.

With such a cellular phone according to the sixth embodiment, by the simple operations of the user touching a desired position on the display unit 5 and operating by moving the operator such as the finger which is touching to the enlarging operation region or reducing operation region, the display scale of the camera through image displayed on the display unit 5 (i.e. imaging scaling of imaging image) can be changed.

Therefore, in order to change the display scale of the camera through image, the desired position on the display unit 5 is to be touched, and the touched finger is to be slid to operate, whereby a hardware key and software keys for performing display scale change operations is not necessary.

Accordingly, a region for providing a hardware key on the housing of the cellular phone can be used for providing other necessary parts and so forth, so effective use of the housing can be made. Alternatively, in the case of not providing a hardware key on the housing of the cellular phone, a housing with less protrusions and concaves is enabled, whereby an improved cellular phone design is enabled.

Also, since a software key does not have to be displayed on the display unit, the inconvenience of the camera through image displayed on the display unit 5 and the software key overlapping one another, making the display item difficult to see, is prevented, and the display region on the display unit 5 can be effectively utilized.

[Seventh Embodiment]

Next, a cellular phone according to a seventh embodiment to which the present disclosure has been applied will be described.

In the case of the cellular phone according to the sixth embodiment described above, in order to transition from an enlarging operation of the camera through image to a reducing operation, the operator positioned in the enlarging operation region has to be temporarily returned to the position of the initial coordinates, after which the operator is moved to the reducing operation region. Similarly, in the case of the cellular phone according to the sixth embodiment described above, in order to transition from a reducing operation of the camera through image to an enlarging operation, the operator positioned in the reducing operation region has to be temporarily returned to a position near the initial coordinates, after which the operator is moved to the enlarging operation region.

That is to say, in order to invert the display scale change control of the camera through image from enlarging processing to reducing processing, or from reducing processing to enlarging processing, the operator has to be temporarily returned near the position of the initial coordinates. Therefore, although only slightly, there has been a problem in that operations are burdensome.

The cellular phone according to the seventh embodiment described below removes the burden of such operations, whereby the cellular phone has improved operability.

Specifically, the cellular phone according to the seventh embodiment herein enables inversion of display scale change operations with good operability by resetting new initial coordinates as to operation position in the event that the display scale from the enlarging processing of the camera through image is at the maximum display scale, or that the display scale from the reducing processing of the camera through image is at the minimum display scale.

Note that the cellular phone according to the above-described sixth embodiment and the cellular phone according to the seventh embodiment to be described below differ only in this point. Therefore, in the description of the cellular phone according to the seventh embodiment, description of only this difference will be made, and duplicative descriptions will be omitted.

FIG. 8 shows a flowchart of camera through image display scale change processing actions on a cellular phone according to this second embodiment. Steps in the flowchart in FIG. 8 that perform the same processing as steps in the flowchart in FIG. 2 used in the event of describing the cellular phone according to the above-described sixth embodiment have the same step numbers referenced as the steps in the flowchart in FIG. 2. Therefore, for detailed description of the steps other than the steps corresponding to the differences described below, the descriptions of the sixth embodiment described above should be referenced, based on the step number.

Figure 22A:
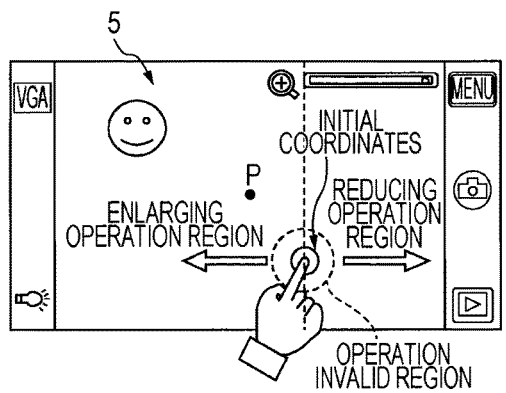
FIGS. 22A-22F are diagrams to describe resetting processing of initial coordinates on a cellular phone according to the seventh embodiment.
Figure 22B:
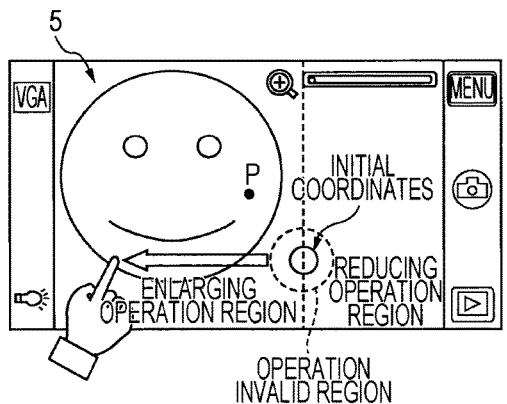

In the flowchart in FIG. 8, the operator is determined to be positioned in the enlarging operation region during startup of the camera, whereby the processing is advanced from step S7 to step S12, and as shown in FIG. 22A and FIG. 22B, upon performing enlarging processing of a camera through image with the display scale changed at the speed corresponding to the distance between the current operation position in the enlarging operation region and the initial coordinates (movement operation distance), the control unit 15 advances the processing to step S23.

In step S23, the control unit 15 determines whether or not the display scale (in this case, the enlargement scale) of the camera through image that is changing at a speed according to the movement operation distance has reached the maximum enlargement scale. In the case of determining that the display scale has not reached the maximum enlargement scale, the enlarging processing of the camera through image cannot continue to be performed, whereby the control unit 15 advances the processing to step S9, and in the case of not detecting a release operation of the operator, continues to execute the enlarging processing corresponding to the operation of the user again.

Figure 22C:
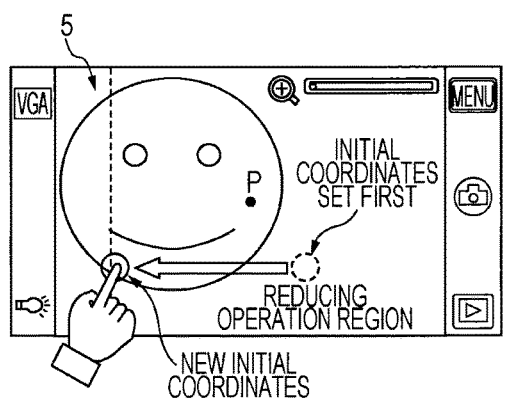

Conversely, in the case of determining that the display scale has reached the maximum enlargement scale, the control unit 15 advances the processing to step S24, and as shown in FIG. 22C, sets the coordinates of the operator at the point in time of arriving at the maximum enlargement scale to new initial coordinates, and returns the processing to step S4 via step S9. Note that along with the new initial coordinates, the operation invalid region corresponding to the new initial coordinates herein may be reset.

In step S4, the control unit 15 resets the enlarging operation region on one of the display region sides, with a straight line passing through the newly set initial coordinates as a border, and resets the reducing operation region on the other display region side. Note that this case is a case wherein the display scale has already reached the maximum enlargement scale, and any greater enlarging processing is difficult, whereby in step S4 herein, only the reducing operation region may be reset.

Figure 22D:
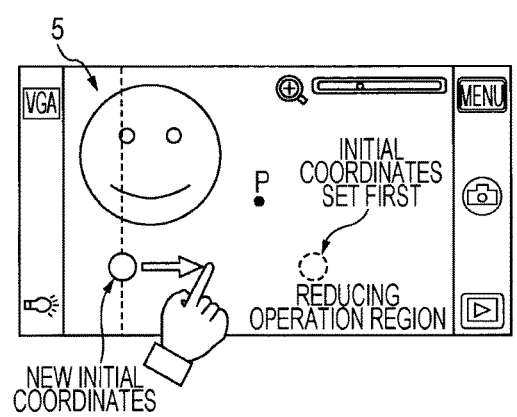

Next, in the case of subjecting a camera through image that has been subjected to enlarging processing to the maximum enlargement scale to reducing operations, the user moves the operator from the newly set initial coordinates in the direction of reducing operations which is the opposite direction as to the direction that the operator has been moved at time of enlarging operations, as shown in FIG. 22D. Thus, the operator of the user is to be positioned in the newly set reducing operation region.

Figure 22E:
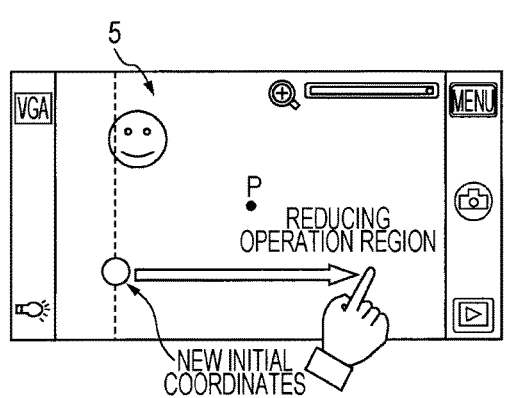

Upon determining that the operator of the user is positioned in the newly set reducing operation region, the control unit 15 in step S8 changes the display scale at a speed corresponding to the movement operation distance between the coordinates of the operator positioned in the newly set reducing operation region and the newly set initial coordinates, and the camera through image of the display unit 5 is subjected to reducing processing at the changed display scale and displayed, as shown in FIG. 22D and FIG. 22E.

Next, the control unit 15 advances the processing to step S21, and determines whether or not the display scale (in this case, the reduction scale) that is changed at the speed according to the movement operation distance has reached the minimum reduction scale. In the case determination is made that the display scale has not reached the minimum reduction scale, reducing processing of the camera through image can continue to be performed, whereby the control unit 15 advances the processing to step S9, and in the case of not detecting a release operation of the operator, the control unit 15 again continues to execute the reducing processing corresponding to the operations of the user.

Figure 22F:
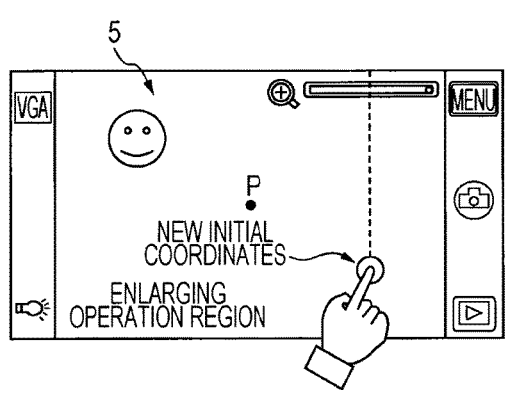

Conversely, in the case of determining that the display scale has reached the minimum reduction scale, as shown in FIG. 22F, the control unit 15 sets the coordinates of the operator at the point in time of reaching the minimum reduction scale to new initial coordinates, and returns the processing to step S4 via step S9. Note that along with the new initial coordinates, the operation invalid region corresponding to the new initial coordinates herein may be reset.

In step S4, the control unit 15 resets the enlarging operation region on one of the display region sides, with a straight line passing through the newly set initial coordinates as a border, and resets the reducing operation region on the other display region side. Note that this case is a case wherein the display scale has already reached the minimum reduction scale, and any further reduction processing is difficult, whereby in step S4 herein, resetting only the enlarging operation region may be performed.

[Advantages of Seventh Embodiment]

As is clear from the above description, with the cellular phone according to the seventh embodiment of the present disclosure, while starting the camera control program, new initial coordinates are set as to the operational position in the event of the enlargement scale reaching the maximum enlargement scale or the reduction scale reaching the minimum reduction scale by the display scale change operations of the camera through image, the display scale is changed according to the distance between these new initial coordinates and the coordinates of the operational position thereafter, and performs enlarging processing or reducing processing of the camera through image.

Thus, after the enlargement scale having reached the maximum enlargement scale or the reduction scale having reached the minimum reduction scale, even if the operator is not returned to the position of the initial coordinates set first, reducing processing and enlarging processing of the camera through image can be performed from the operational position at which the enlargement scale has reached the maximum enlargement scale and the operational position at which the reduction scale has reached the minimum reduction scale.

In other words, upon the enlargement scale of the camera through image having reached the maximum enlargement scale by performing enlarging operations, the user can operate by moving the operator thereof in the direction opposite as to the direction in which the enlarging processing has been performed, thereby performing reducing operations of the enlarged camera through image.

Similarly, upon the reduction scale of the camera through image having reached the minimum reduction scale by performing reducing operations, the user can operate by moving the operator thereof in the direction opposite as to the direction in which the reducing processing has been performed, thereby performing enlarging operations of the reduced camera through image.

Therefore, returning the operator temporarily to the position of the initial coordinates in order to invert the display scale change control of the camera through image from enlarging processing to reducing processing, or from reducing processing to enlarging processing is not necessary, whereby enlarging operations or reducing operations of the camera through image can be performed with good operability, while obtaining the same advantages of the cellular phone in the first embodiment described above.

[Eighth Embodiment]

Next, a cellular phone according to an eighth embodiment to which the present disclosure has been applied will be described.

In the case of the cellular phone according to the sixth embodiment and the cellular phone according to the seventh embodiment, enlarging processing or reducing processing of the camera through image is performed with the center P of the display unit 5 as a base.

Conversely, with the cellular phone according to the third embodiment, face recognition processing of a camera through image, and in the case that a human face is recognized in the camera through image, the face image herein is moved to the center P of the display unit 5 and thereafter enlarging processing or reducing processing is performed.

Note that the cellular phones according to the sixth embodiment and seventh embodiment described above and the cellular phone according to the eighth embodiment described below differ only in this point. Therefore, in the description of the cellular phone according to the eighth embodiment, only the difference will be described, and duplicative descriptions will be omitted.

FIG. 10 shows a flowchart of the first half of change processing actions of the camera through image display scale of the cellular phone according to the eighth embodiment, and FIG. 11 shows a flowchart of the second half of change processing actions of display scale of the camera through image of the cellular phone according to the eighth embodiment.

In the flowcharts in FIG. 10 and FIG. 11, for the steps that perform the same processing as the steps in the flowchart in FIG. 2 used in the event of describing the cellular phone according to the sixth embodiment described above and the steps in the flowchart in FIG. 8 used in the event of describing the cellular phone according to the seventh embodiment described above, the same step numbers are appended as the steps in the flowchart in FIG. 2 and the flowchart in FIG. 8. Therefore, for detailed description of the steps other than the steps corresponding to the differences described below, the descriptions of the sixth embodiment described above or the descriptions of the seventh embodiment described above should be referenced, based on the step numbers.

First, in the flowchart in FIG. 10, upon transitioning to display scale change mode in step S2 during startup of the camera, the control unit 15 advances the processing to step S31. In step S31 herein, the control unit 15 performs recognition processing of a face image in a display item that is displayed on the display unit 5, as shown in FIG. 12A, based on the face recognition program stored in the memory 14 shown in FIG. 1.

Note that in this example, the description is advanced as the display processing program that performs display scale change processing of the camera through image and the face recognition program having been stored separately in the memory 14, but the face recognition program may be built into the camera control program as a program that is a part of the camera control program.

Next, in step S3 and step S4 as described above, the control unit 15 sets the initial coordinates, operation invalid region, enlarging operation region, and reducing operation region. In the case of detecting a movement operation of the operator in the enlarging operation region in step S7, the control unit 15 advances the processing to step S35 in the flowchart in FIG. 11, and in the case of detecting a movement operation of the operator in the reducing operation region in step S7 (i.e. in the case of determining No in step S7), the control unit 15 advances the processing to step S32 in the flowchart in FIG. 11.

Upon advancing the processing to step S35 in the flowchart in FIG. 11 by detecting a movement operation of the operator in the enlarging operation region, the control unit 15 determines whether or not a face has been able to be recognized from the camera through image currently displayed on the display unit 5 with the face recognition processing executed in step S31 above.

In the case of determining that a face has been able to be recognized, the control unit 15 advances the processing to step S36, and in the case of determining that a face has not been able to be recognized, advances the processing to step S37.

Figure 23A:
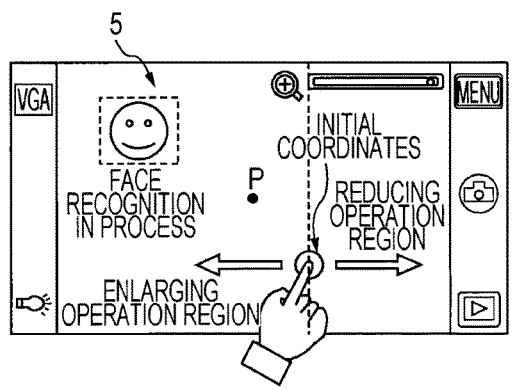
FIGS. 23A-23D are diagrams to describe enlarging operations of a display item on a cellular phone according to the eighth embodiment of the present disclosure.
Figure 23B:
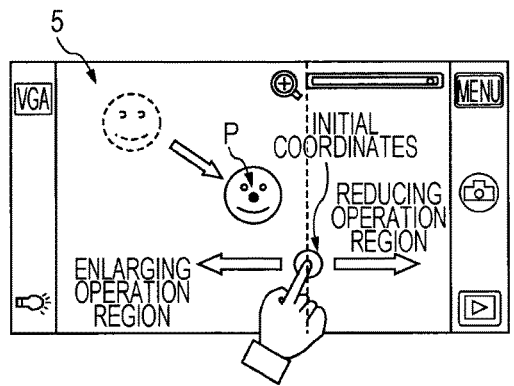

In step S36, the face has been able to be recognized, whereby the control unit 15 performs control so as to move and display the face image recognized as shown in FIG. 23B into the center P of the display unit 5. In other words, in this case, the control unit 15 matches the center of the face image and the center P of the display unit 5, and displays the face image on the display unit 5.

Figure 23C:
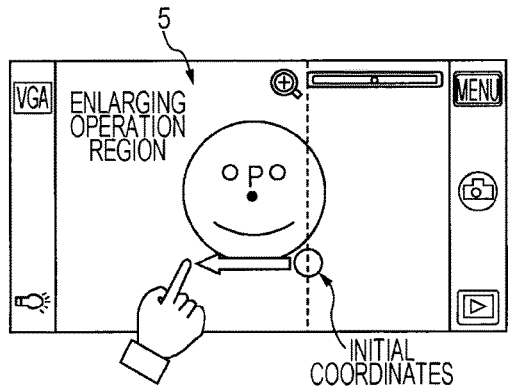
Figure 23D:
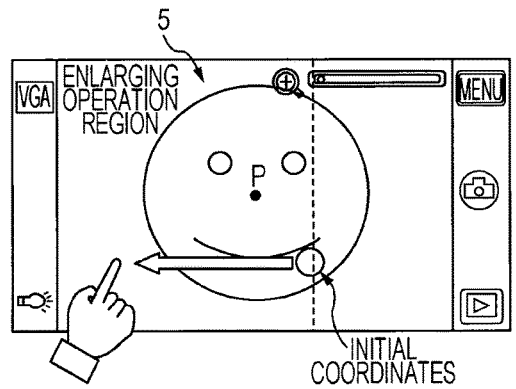

In step S36 the control unit 15 changes the display scale change speed according to the above-mentioned movement operation distance, and gradually enlarges the camera through image on the display unit 5, with the center P of the display unit 5 as a base thereof, so as to be at the changed display scale. Thus, the face image moved to the center P of the display unit 5 is displayed with a gradually larger display scale, according to the enlarging operation of the user, as shown in FIG. 23C and FIG. 23D. Upon performing such enlarging processing, the control unit 15 advances the processing to step S23.

Conversely, upon advancing the processing to step S37 by determining that the face has not be able to be recognized, a face image to move to the center P does not exist, whereby the control unit 15 performs enlarging processing of the camera through image with the center P of the display unit 5 as a base, as described above with the sixth embodiment and seventh embodiment, and advances the processing to step S23.

In step S23 and step S24, as described with the seventh embodiment, in the event that the face image or the like that has been subjected to enlarging processing is at the maximum enlargement scale, the control unit 15 sets new initial coordinates as to the coordinates of the operation position thereof and prepares for reducing operations thereafter. The description of the seventh embodiment should be referenced for details.

Next, upon advancing the processing to step S32 of the flowchart in FIG. 11 by detecting the movement operation of the operator in the reducing operation region, the control unit 15 determines in step S7 of the flowchart in FIG. 10 whether or not a face has been able to be recognized from the camera through image currently displayed on the display unit 5 with the face recognition processing executed in step S31.

In the case of determining that a face has been able to be recognized, the control unit 15 advances the processing to step S33, and in the case of determining that a face has not been able to be recognized, advances the processing to step S34.

Figure 24A:
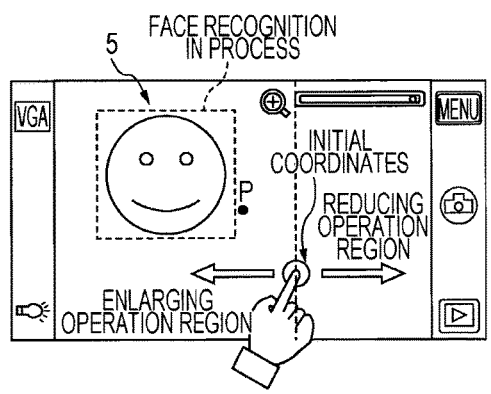
FIGS. 24A-24D are diagrams to describe reducing operations of a display item on a cellular phone according to the eighth embodiment of the present disclosure.
Figure 24B:
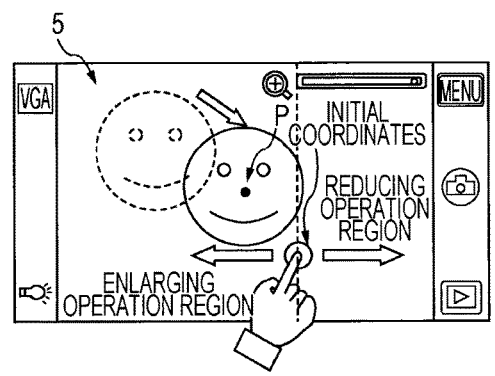

In step S33, the face has been able to be recognized, whereby the control unit 15 performs control to move and display the face image recognized as shown in FIG. 24A and FIG. 24B in the center P of the display unit 5. In other words, in this case, the control unit 15 matches the center of the face image and the center P of the display unit 5, and displays the face image on the display unit 5.

Figure 24C:
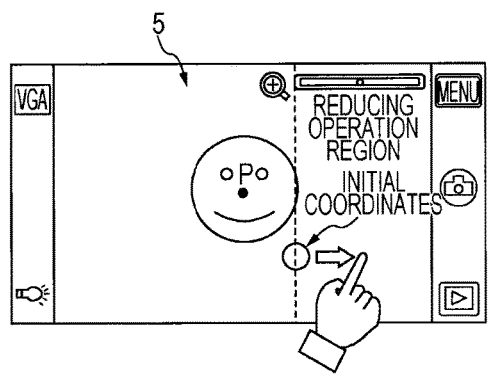
Figure 24D:
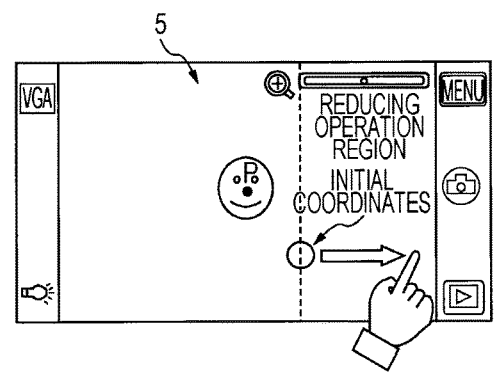

In step S33 the control unit 15 changes the display scale change speed according to the above-mentioned movement operation distance, and gradually reduces the display item on the display unit 5, with the center P of the display unit 5 as a base thereof, so as to be the changed display scale. Thus, the face image moved to the center P of the display unit 5 is displayed with a gradually smaller display scale, according to the reducing operation of the user, as shown in FIG. 24C and FIG. 24D. Upon performing such reducing processing, the control unit 15 advances the processing to step S21.

Conversely, upon advancing the processing to step S34 by determining that the face has not be able to be recognized, a face image to move to the center P does not exist, whereby the control unit 15 performs reducing processing of the camera through image with the center P of the display unit 5 as a base, as described above with the first embodiment and second embodiment, and advances the processing to step S21.

In step S21 and step S22, as described with the seventh embodiment, in the event that the face image or the like that has been subjected to reducing processing is at the minimum reduction scale, the control unit 15 sets new initial coordinates as to the coordinates of the operation position thereof and prepares for enlarging operations thereafter. The description of the seventh embodiment should be referenced for details.

[Advantages of Eighth Embodiment]

As is clear from the above description, with the cellular phone according to the eighth embodiment of the present disclosure, upon transitioning to display scale change mode, a face image in the camera through image displayed on the display unit 5 is subjected to recognition processing. In the case of recognizing the face image, with this cellular phone, after having moved the recognized face image to the center P of the display unit 5, the camera through image of the display unit 5 is gradually enlarged or reduced, with the center P of the display unit 5 as a base.

Thus, in the case that a face image exists in the camera through image displayed on the display unit 5, the face image is automatically displayed at the center P of the display unit 5, after which enlarging processing or reducing processing can be performed, and the same advantages of the above-described embodiments can be obtained.

[Ninth Embodiment]

Next, a cellular phone according to a ninth embodiment to which the present disclosure has been applied will be described.

In the case of the cellular phone in the eighth embodiment described above, the face image recognized from the camera through image is moved to the center of the display unit 5 to be subjected to enlarging processing or reducing processing. Conversely, with the cellular phone in the ninth example described below, the entire camera through image is moved so that the location corresponding to the coordinates operated by touch by the user is positioned at the center P of the display unit 5, after which enlarging processing or reducing processing is performed.

Note that the cellular phone according to the eighth embodiment described above and the cellular phone according to the ninth embodiment described below differ only in this point. Therefore, in the description of the cellular phone according to the ninth embodiment, description of only this difference will be made, and duplicative descriptions will be omitted.

FIG. 14 shows a flowchart of the display scale change processing actions according to the ninth embodiment.

In the flowchart in FIG. 14, for the steps that perform the same processing as the steps in the flowchart in FIG. 2 used in the event of describing the cellular phone according to the sixth embodiment described above and the steps in the flowchart in FIG. 8 used in the event of describing the cellular phone according to the seventh embodiment described above, the same step numbers are appended as the steps in the flowchart in FIG. 2 and the flowchart in FIG. 8. Therefore, for detailed description of the steps other than the steps corresponding to the differences described below, the descriptions of the sixth embodiment described above or the descriptions of the seventh embodiment described above should be referenced, based on the step numbers.

First, in the case of the cellular phone according to the ninth embodiment, the user operates, by touch with an operator such as a finger (the above-described long-pressing operation or the like), a location on the entire display region of the display unit 5 on which a camera through image is displayed, that is desired to be the center of enlarging operations or reducing operations (the location desired to be the center of enlarging operations or reducing operations) during camera control mode startup.

Figure 25A:
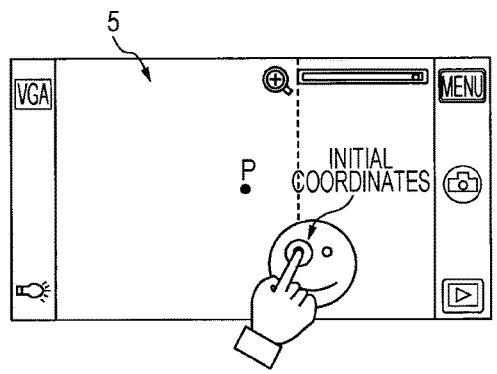
FIGS. 25A-25D are diagrams to describe enlarging operations of a display item on a cellular phone according to a ninth embodiment of the present disclosure.
Figure 26A:
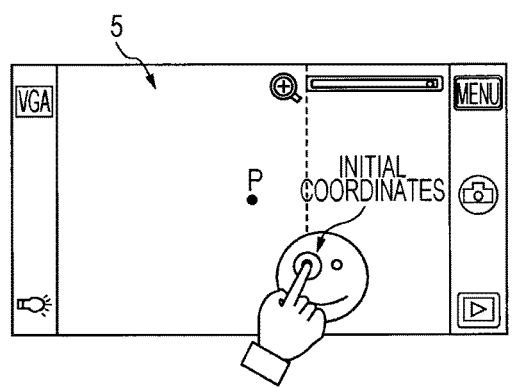
FIGS. 26A-26D are diagrams to describe reducing operations of a display item on a cellular phone according to the ninth embodiment of the present disclosure.

Upon this touching operation being performed, the control unit 15 transitions to display scale change mode in step S1 and step S2 in the flowchart in FIG. 14, and in step S3 and step S4, sets the coordinates of the location operated with the operator as shown in FIG. 25A and FIG. 26A as the initial coordinates, while performing settings of the invalid operation region and enlarging operation region and so forth.

That is to say, in the case of the cellular phone in the ninth example, the location of the initial coordinates becomes the location specified by the user as the center of the enlarging operation or reducing operations.

Figure 25B:
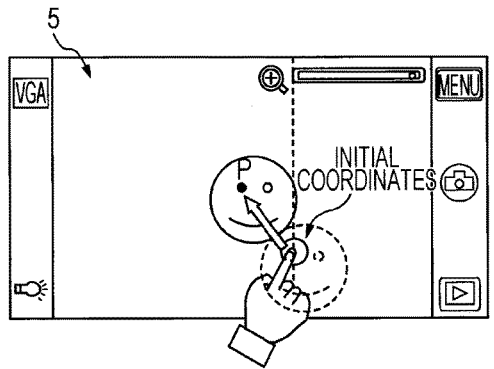
Figure 26B:
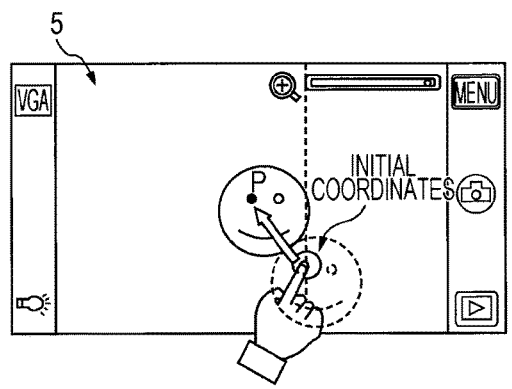

Next, in step S41 in the flowchart in FIG. 14, the control unit 15 performs control so as to move and display, of the camera through image displayed on the display unit 5, the camera through image so as to position the portion of the initial coordinates on the center P of the display unit, as shown in FIG. 25B and FIG. 26B.

That is to say, in this step S41, the control unit 15 performs control so as to move and display the entire camera through image so that the portion corresponding to the initial coordinates which is the location specified by the user as a location which is desired to be in the center of the enlarging operation or the reducing operation is positioned at the center P of the display unit 5.

Next, in step S7 in the flowchart in FIG. 14, upon detecting a movement operation in the enlarging operation region, the control unit 15 advances the processing to step S12, and subjects the camera through image displayed on the display unit 5 to enlarging processing so as to be at the display scale changed at the speed corresponding to the movement operation distance in the enlarging operation region, with the center P as a base.

Figure 25C:
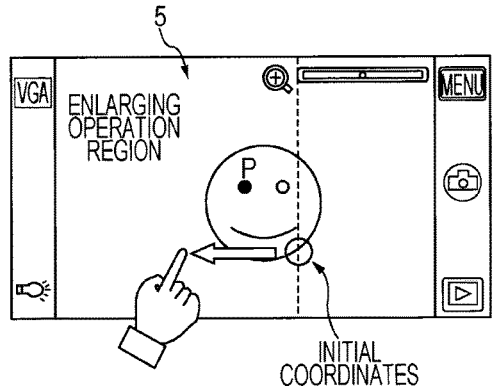
Figure 25D:
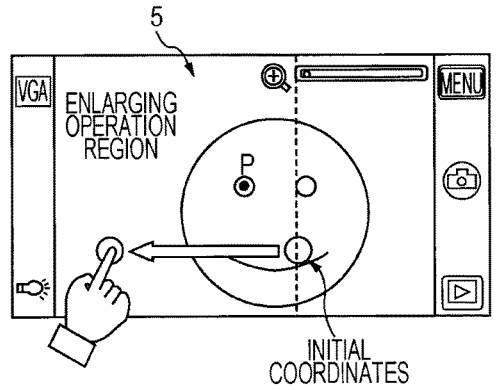

Thus, as shown in FIG. 25C and FIG. 25D, the camera through image is gradually enlarged according to the enlarging operation of the user, with the portion moved to the center P of the display unit 5 as a base. Upon performing such enlarging processing, the control unit 15 advances the processing to step S23.

In step S23 and step S24, as described with the seventh embodiment, in the event that the camera through image that is subject to enlarging processing is at the maximum enlargement scale, the control unit 15 sets new initial coordinates as to the coordinates of the operation position, and prepares for reducing operations thereafter. The description of the seventh embodiment should be referenced for details.

Conversely, in step S7 in the flowchart in FIG. 14, upon detecting a movement operation in the reducing operation region, the control unit 15 advances the processing to step S8, and subjects the camera through image displayed on the display unit 5 to reducing processing so as to be at the display scale changed at the speed corresponding to the movement operation distance in the reducing operation region, with the center P as a base.

Figure 26C:
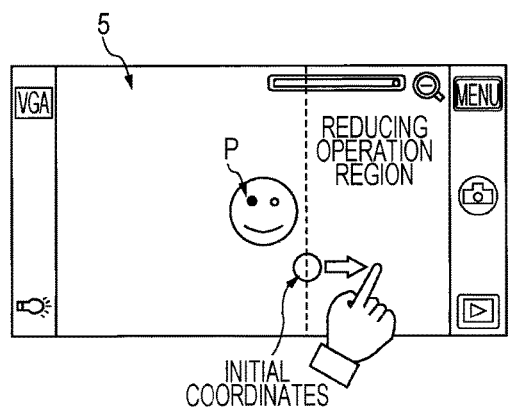
Figure 26D:
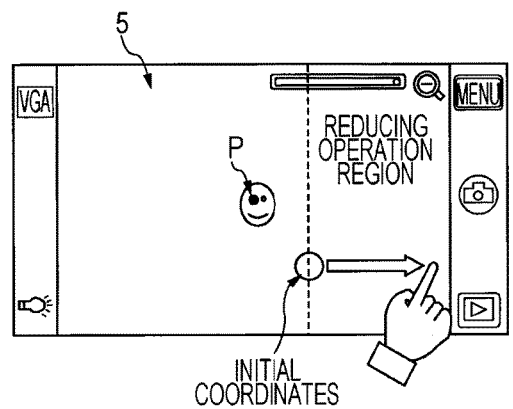

Thus, as shown in FIG. 26C and FIG. 26D, the camera through image is gradually reducing according to the reducing operation of the user, with the portion moved to the center P of the display unit 5 as a base. Upon performing such reducing processing, the control unit 15 advances the processing to step S21.

In step S21 and step S22, as described with the seventh embodiment, in the event that the display item that is subject to reducing processing is at the minimum reduction scale, the control unit 15 sets new initial coordinates as to the coordinates of the operation position, and prepares for enlarging operations thereafter. The description of the seventh embodiment should be referenced for details.

[Advantages of Ninth Embodiment]

As is clear from the above description, with the cellular phone according to the ninth embodiment of the present disclosure, at startup of the camera control program, the location on the display unit 5 which the user touches to operate in the event of transitioning to display scale change mode of the camera through image is set as initial coordinates, while the camera through image which is displayed on the display unit 5 is controlled so as to be moved and displayed so that the touched location is positioned at the center of the display unit 5.

Subsequently, according to enlarging operations or reducing operations performed by the user, the camera through image is subjected to enlarging processing or reducing processing, with the center of the display unit 5 as a base.

Thus, after displaying the location specified by the user with touching operations at the center P of the display unit 5, the entire camera through image can be subjected to enlarging processing or reducing processing, and also the same advantages described above with the embodiments can be obtained.

[Tenth Embodiment]

Next, a cellular phone according to a tenth embodiment to which the present disclosure is applied will be described.

In the case of the cellular phone in the ninth embodiment described above, enlarging processing or reducing processing of a camera through image is performed with the location corresponding to coordinates that the user touches to operation as the center. Conversely, with the cellular phone according to the tenth embodiment to be described below, enlarging processing or reducing processing of a camera through image is performed with an object, which has been touched and operated by the user, as the center.

Note that the cellular phone according to the ninth embodiment described above and the cellular phone according to the tenth embodiment described below differ only in this point. Therefore, in the description of the cellular phone according to the tenth embodiment, only the difference will be described, and duplicative descriptions will be omitted.

FIG. 17 shows a flowchart of display scale change processing actions of the cellular phone according to the tenth embodiment herein.

In the flowchart in FIG. 17, for the steps that perform the same processing as the steps in the flowchart in FIG. 2 used in the event of describing the cellular phone according to the sixth embodiment described above and the steps in the flowchart in FIG. 8 used in the event of describing the cellular phone according to the seventh embodiment described above, the same step numbers are appended as the steps in the flowchart in FIG. 2 and the flowchart in FIG. 8. Therefore, for detailed description of the steps other than the steps corresponding to the differences described below, the descriptions of the sixth embodiment described above or the descriptions of the seventh embodiment described above should be referenced, based on the step numbers.

First, in the case of the cellular phone according to the tenth embodiment, the user touches with an operator such as a finger to operate an object, out of all the camera through images displayed on the display unit 5, which is desired to be the center of the enlarging processing or reducing processing.

Upon the touching operation having been performed, the control unit 15 transitions to display scale change mode from normal mode in step S1 and step S2 in the flowchart in FIG. 17, and in step S3 and step S4 sets the coordinates of the location operated by touch with an operator as initial coordinates, while performing settings of the invalid operation region and enlarging operation region and so forth.

Figure 27A:
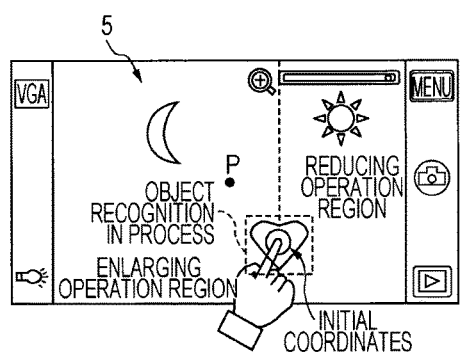
FIGS. 27A-27D are diagrams to describe enlarging operations of a display item on a cellular phone according to a tenth embodiment of the present disclosure.
Figure 28A:
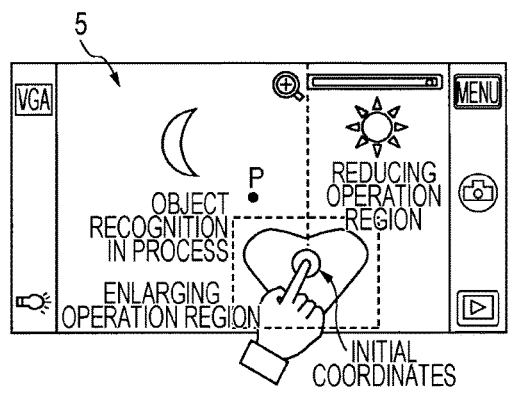
FIGS. 28A-28D are diagrams to describe reducing operations of a display item on a cellular phone according to the tenth embodiment of the present disclosure.

Next, the control unit 15 advances the processing to step S51 in the flowchart in FIG. 17, and as shown in FIG. 27A and FIG. 28A, subjects the object corresponding to the initial coordinates to recognition processing, and advances the processing to step S52.

In step S52, the control unit 15 determines whether or not an object corresponding to the initial coordinates has been able to be recognized, and in the case of determining that the object has been able to be recognized, advances the flow to step S53, and in the case of determining that the object has not been able to be recognized, skips the processing in step S53 and advances the processing to step S5.

Figure 27B:
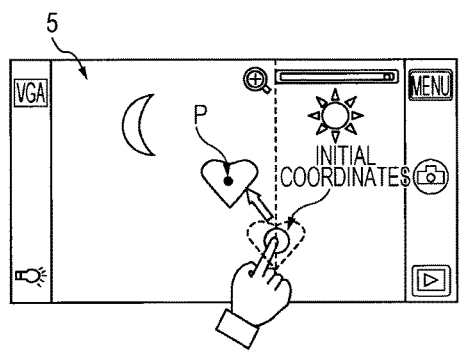
Figure 28B:
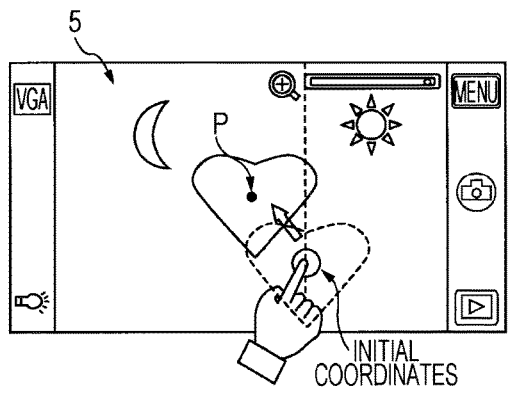

Upon advancing the processing to step S53 by determining that the object corresponding to the initial coordinates has been able to be recognized, the control unit 15 performs control to move and display the recognized object so that the center of the recognized object and the center P of the display unit 5 match, as shown in FIG. 27B and FIG. 28B.

That is to say, in the case of the cellular phone according to the tenth embodiment, the control unit 15 recognizes an object displayed at a location on the display unit 5 that has been operated by touch by the user, and moves and displays the entire camera through image so that the object herein is positioned at the center of the display unit 5.

Next, in step S7 in the flowchart in FIG. 17 herein, upon detecting a movement operation in the enlarging operation region, the control unit 15 advances the processing to step S12, and subjects the camera through image displayed on the display unit 5 to enlarging processing so as to be the display scale changed at the speed corresponding to the movement operation distance in the enlarging operation region, with the center P as a base.

Figure 27C:
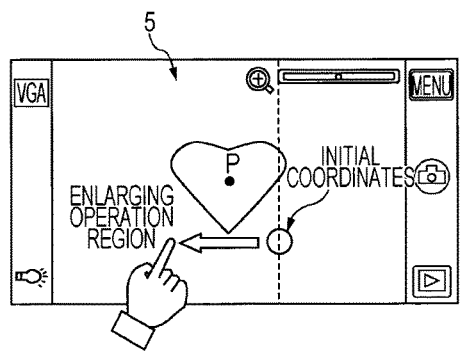
Figure 27D:
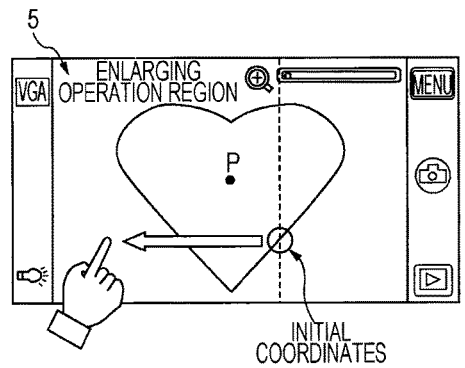

Thus, in the case that an object corresponding to the initial coordinates is recognized, the camera through image is gradually enlarged according to the enlarging operation of the user, with the object moved to the center P of the display unit 5 as a base, as shown in FIG. 27C and FIG. 27D.

Also, in the case that an object corresponding to the initial coordinates is not recognized, the camera through image is gradually enlarged according to the enlarging operation of the user, with the center P of the display unit 5 as a base.

Upon performing such enlarging processing, the control unit 15 advances the processing to step S23.

In step S23 and step S24, as described with the seventh embodiment, in the event that the display item subjected to enlarging processing is at the maximum enlargement scale, the control unit 15 sets new initial coordinates as to the coordinates of the operation position thereof, and prepares for reducing operations thereafter. The description of the seventh embodiment should be referenced for details.

Next, in step S7 in the flowchart in FIG. 17, upon advancing the processing to step S8 by detecting movement operation in the reducing operation region, the control unit 15 subjects the camera through image displayed on the display unit 5 to reducing processing so as to be the display scale changed at the speed corresponding to the movement operation distance in the reducing operation region, with the center P as a base.

Figure 28C:
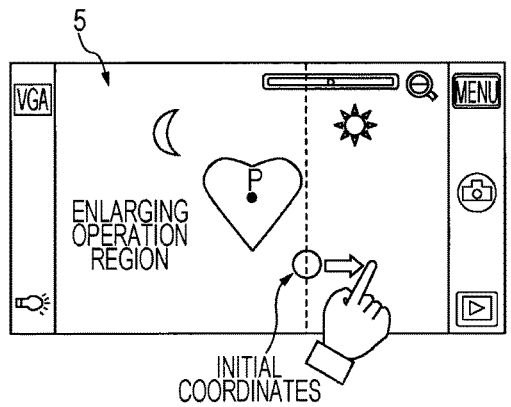
Figure 28D:
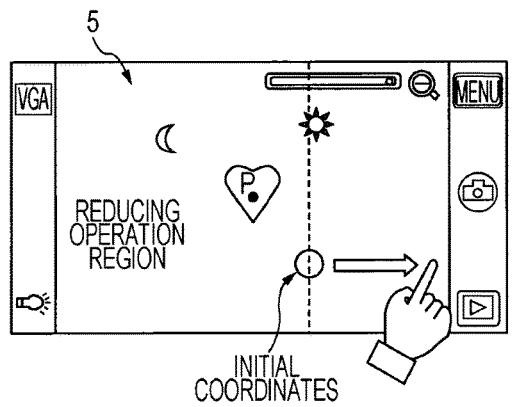

Thus, in the case that an object corresponding to the initial coordinates is recognized, the display item is gradually reduced according to the reducing operation of the user, with the object moved to the center P of the display unit 5 as a base, as shown in FIG. 28C and FIG. 28D.

Also, in the case that an object corresponding to the initial coordinates is not recognized, the camera through image is gradually reduced according to the reducing operation of the user, with the center P of the display unit 5 as a base.

Upon performing such reducing processing, the control unit 15 advances the processing to step S21.

In step S21 and step S22, as described with the seventh embodiment, in the event that the display item subjected to reducing processing is at the minimum reduction scale, the control unit 15 sets new initial coordinates as to the coordinates of the operation position thereof, and prepares for enlarging operations thereafter. The description of the seventh embodiment should be referenced for details.

[Advantages of Tenth Embodiment]

As is clear from the above description, with the cellular phone according to the tenth embodiment of the present disclosure, an object displayed at the location on the display unit 5 which the operator touches to operate in the event of transitioning to display scale change mode is recognized, and the camera through image which is displayed on the display unit 5 is controlled so as to be moved and displayed so that the object is positioned at the center of the display unit 5.

Subsequently, according to enlarging operations or reducing operations performed by the user, the display item is subjected to enlarging processing or reducing processing, with the center of the display unit 5 as a base.

Thus, after displaying the object specified by the user with touching operations at the center P of the display unit 5, the entire camera through image can be subjected to enlarging processing or reducing processing, and also the same advantages described above with the embodiments can be obtained.

[Display Processing Device, Display Processing Method, Display Processing Program, Storage Medium Storing Display Processing Program, and Cellular Phone Device Provided by the Embodiments]

(1) An information processing apparatus comprising: a display; a touch panel disposed on or integrally formed with the display that detects a touch input by a user; and a controller that sets initial coordinates corresponding to a first position of a touch input detected by the touch panel; sets a first region and a second region of the display based on the initial coordinates; and controls the display to change a scale of a displayed image based on a distance between the initial coordinates and a second position of the touch input continuously detected by the touch panel in one of the first and second regions.

(2) The information processing apparatus of (1), wherein the controller sets the first and second regions using the initial coordinates as a base.

(3) The information processing apparatus of any of (1) to (2), wherein the controller sets the first region as a region corresponding to an enlarging operation.

(4) The information processing apparatus of (3), wherein the controller controls the display to enlarge the scale of the displayed image when the second position of the touch input is in the first region.

(5) The information processing apparatus of any of (1) to (4), wherein the controller sets the second region as a region corresponding to a reducing operation.

(6) The information processing apparatus of (5), wherein the controller controls the display to reduce the scale of the displayed image when the second position of the touch input is in the second region.

(7) The information processing apparatus of any of (1) to (6), wherein the controller controls the display to change the scale of the displayed image at a speed corresponding to the distance between the initial coordinates and the second position of the touch input.

(8) The information processing apparatus of any of (1) to (7), wherein the controller controls the display to linearly change the scale of the displayed image at a speed corresponding to the distance between the initial coordinates and the second position of the touch input.

(9) The information processing apparatus of (7), wherein the controller controls the display to change the scale of the displayed image at a first speed when the distance between the initial coordinates and the second position of the touch input is less than a first predetermined distance, and controls the display to change the scale of the displayed image at a second speed, which is greater than the first speed, when the distance between the initial coordinates and the second position of the touch input is greater than or equal to the first predetermined distance.

(10) The information processing apparatus of any of (1) to (9), wherein the controller sets an invalid operation region surrounding the initial coordinates, and controls the display to not change a scale of a displayed image when the second position of the touch input is within the invalid operation region.

(11) The information processing apparatus of any of (1) to (10), wherein the controller determines that the scale of the displayed image has reached an upper or lower limit as a result of the changing, and determines a current position of the touch input when the scale of the displayed image reaches the upper or lower limit.

(12) The information processing apparatus of (11), wherein the controller sets second coordinates corresponding to the current position of the touch input when the scale of the displayed image reaches the upper or lower limit, and sets at least a third region of the display based on the second coordinates.

(13) The information processing apparatus of (12), wherein the controller controls the display to change the scale of the displayed image based on a distance between the second coordinates and a third position of the touch input continuously detected by the touch panel in the third region.

(14) The information processing apparatus of any of (1) to (13), wherein the controller detects a face image from the image displayed by the display, and controls the display to display the detected face image in a center of the display when the touch input is initially detected by the touch panel.

(15) The information processing apparatus of any of (1) to (14), wherein the controller determines that the image is displayed at a position corresponding to the first position of the touch input detected by the touch panel, and controls the display to display the image at a center of the display before controlling the display to change the scale of the image.

(16) The information processing apparatus of any of (1) to (15), wherein the controller sets the initial coordinates corresponding to the first position of the touch input detected by the touch panel only after the touch input has been detected for greater than a predetermined amount of time.

(17) The information processing apparatus of any of (1) to (16), further comprising: a camera unit, wherein the image displayed by the display is an image captured by the camera unit, and the controller controls a zoom parameter of the camera unit in accordance with the change of scale of the displayed image.

(18) A method performed by an information processing apparatus including a display and a touch panel disposed on or integrally formed with the display that detects a touch input by a user, the method comprising: setting initial coordinates corresponding to a first position of a touch input detected by the touch panel; setting a first region and a second region of the display based on the initial coordinates; and controlling the display to change a scale of a displayed image based on a distance between the initial coordinates and a second position of the touch input continuously detected by the touch panel in one of the first and second regions.

(19) A non-transitory computer-readable medium including a computer program, which, when executed by an information processing apparatus including a display and a touch panel disposed on or integrally formed with the display that detects a touch input by a user, causes the information processing apparatus to perform a process comprising: setting initial coordinates corresponding to a first position of a touch input detected by the touch panel; setting a first region and a second region of the display based on the initial coordinates; and controlling the display to change a scale of a displayed image based on a distance between the initial coordinates and a second position of the touch input continuously detected by the touch panel in one of the first and second regions.

[Modified Example]

The above-described embodiments are embodiments wherein the present disclosure is applied to a cellular phone, but other than this cellular phone, the present disclosure can be applied to electronic devices having a function to display a display item as to a display unit, such as a PHS telephone (PHS: Personal Handyphone System), PDA device (PDA: Personal Digital Assistant), electronic camera device, electronic video camera device, portable gaming device, notebook-type personal computer device, or the like. In any of these cases, the same advantages as the above-described embodiments can be obtained.

Lastly, as embodiments of the present disclosure, through various modifications and combinations of the design or other elements, embodiments other than the embodiments described above may be made within the scope of claims of the present disclosure or within a scope similar to the claims. Therefore, the present disclosure is not to be limited to the above-described embodiments which are described as an example. This is understood as a matter of course by one skilled in the art.

The invention claimed is:

1. An information processing apparatus comprising:
   a display that displays an image;
   a touch panel disposed on or integrally formed with the display that detects a touch input by a user using an operator; and
   a controller that
      sets a nonzero predetermined range of movement of the operator;
      sets initial coordinates corresponding to a first position of a touch input detected by the touch panel after the first touch input has been detected for greater than a predetermined amount of time;
      sets a first region and a second region of the display based on the initial coordinates while the touch input is continuously detected by the touch panel;
      detects an object from the image displayed by the display at the first position while the touch input is continuously detected by the touch panel;
      performs recognition processing on the object in the image;
      determines from an output of the recognition processing whether the object is able to be recognized by the recognition processing;
      controls the display, when the object is able to be recognized by the recognition processing, to adjust a position of the image such that the detected object is positioned in a position related to a center of the display while the touch input is continuously detected by the touch panel;
      determines, from a second position of the touch input continuously detected by the touch panel, whether the operator has moved out of a circular operation invalid region defined by the predetermined range of movement of the operator; and
      controls the display, in response to a determination that the operator has moved out of the operation invalid region, to change a scale of the displayed image based on a distance between the initial coordinates and the second position of the touch input continuously detected by the touch panel in one of the first and second regions, wherein the scale of the displayed image is changed on a basis of the position of the detected object,
   wherein the controller controls the display to change the scale of the displayed image at a speed determine by the distance between the initial coordinates and the second position of the touch input.

2. The information processing apparatus of claim 1, wherein
   the controller sets the first and second regions using the initial coordinates as a base.

3. The information processing apparatus of claim 1, wherein
   the controller sets the first region as a region corresponding to an enlarging operation.

4. The information processing apparatus of claim 3, wherein
   the controller controls the display to enlarge the scale of the displayed image when the second position of the touch input is in the first region.

5. The information processing apparatus of claim 1, wherein
   the controller sets the second region as a region corresponding to a reducing operation.

6. The information processing apparatus of claim 5, wherein the controller controls the display to reduce the scale of the displayed image when the second position of the touch input is in the second region.

7. The information processing apparatus of claim 1, wherein
the controller controls the display to linearly change the scale of the displayed image at a speed corresponding to the distance between the initial coordinates and the second position of the touch input.

8. The information processing apparatus of claim 1, wherein
the controller controls the display to change the scale of the displayed image at a first speed when the distance between the initial coordinates and the second position of the touch input is less than a first predetermined distance, and controls the display to change the scale of the displayed image at a second speed, which is greater than the first speed, when the distance between the initial coordinates and the second position of the touch input is greater than or equal to the first predetermined distance.

9. The information processing apparatus of claim 1, wherein
the controller determines that the scale of the displayed image has reached an upper or lower limit as a result of the changing, and determines a current position of the touch input when the scale of the displayed image reaches the upper or lower limit.

10. The information processing apparatus of claim 9, wherein
the controller sets second coordinates corresponding to the current position of the touch input when the scale of the displayed image reaches the upper or lower limit, and sets at least a third region of the display based on the second coordinates.

11. The information processing apparatus of claim 10, wherein
the controller controls the display to change the scale of the displayed image based on a distance between the second coordinates and a third position of the touch input continuously detected by the touch panel in the third region.

12. The information processing apparatus of claim 1, further comprising:
a camera unit, wherein
the image displayed by the display is an image captured by the camera unit, and
the controller controls a zoom parameter of the camera unit in accordance with the change of scale of the displayed image.

13. A method performed by an information processing apparatus including a display and a touch panel disposed on or integrally formed with the display that detects a touch input by a user using an operator, the method comprising:
setting a nonzero predetermined range of movement of the operator;
setting initial coordinates corresponding to a first position of a touch input detected by the touch panel after the first touch input has been detected for greater than a predetermined amount of time;
setting a first region and a second region of the display based on the initial coordinates while the touch input is continuously detected by the touch panel;
detecting an object from an image displayed by the display at the first position while the touch input is continuously detected by the touch panel;
performing recognition processing on the object in the image;
determining from an output of the recognition processing whether the object is able to be recognized by the recognition processing;
adjusting a position of the image, when the object is able to be recognized by the recognition processing, such that the detected object is positioned in a position related to a center of the display while the touch input is continuously detected by the touch panel;
determining, from a second position of the touch input continuously detected by the touch panel, whether the operator has moved out of a circular operation invalid region defined by the predetermined range of movement of the operator; and
controlling the display, in response to a determination that the operator has moved out of the operation invalid region, to change a scale of the displayed image based on a distance between the initial coordinates and the second position of the touch input continuously detected by the touch panel in one of the first and second regions, wherein the scale of the displayed image is changed on a basis of the position of the detected object,
wherein the controlling controls the display to change the scale of the displayed image at a speed determine by the distance between the initial coordinates and the second position of the touch input.

14. The information processing apparatus of claim 1, wherein
the first region is a left side of the display and the second region is a right side of the display, and
the first and second regions are separated by a virtual vertical line extending from the bottom of the display to the top of the display.

15. The method according to claim 13, wherein:
the controlling controls the display to change the scale of the displayed image at a first speed when the distance between the initial coordinates and the second position of the touch input is less than a first predetermined distance, and controls the display to change the scale of the displayed image at a second speed, which is greater than the first speed, when the distance between the initial coordinates and the second position of the touch input is greater than or equal to the first predetermined distance.

16. A non-transitory computer-readable medium including a computer program, which, when executed by an information processing apparatus including a display and a touch panel disposed on or integrally formed with the display that detects a touch input by a user using an operator, causes the information processing apparatus to perform a process comprising:
setting a nonzero predetermined range of movement of the operator;
setting initial coordinates corresponding to a first position of a touch input detected by the touch panel after the first touch input has been detected for greater than a predetermined amount of time;
setting a first region and a second region of the display based on the initial coordinates while the touch input is continuously detected by the touch panel;
detecting an object from an image displayed by the display at the first position while the touch input is continuously detected by the touch panel;
performing recognition processing on the object in the image;

determining from an output of the recognition processing whether the object is able to be recognized by the recognition processing;

adjusting a position of the image, when the object is able to be recognized by the recognition processing, such that the detected object is positioned in a position related to a center of the display while the touch input is continuously detected by the touch panel;

determining, from a second position of the touch input continuously detected by the touch panel, whether the operator has moved out of a circular operation invalid region defined by the predetermined range of movement of the operator; and controlling the display, in response to a determination that the operator has moved out of the operation invalid region, to change a scale of the displayed image based on a distance between the initial coordinates and the second position of the touch input continuously detected by the touch panel in one of the first and second regions, wherein the scale of the displayed image is changed on a basis of the position of the detected object, wherein the controlling controls the display to change the scale of the displayed image at a speed determine by the distance between the initial coordinates and the second position of the touch input.

17. The non-transitory computer-readable medium according to claim 16, wherein:

the controlling controls the display to change the scale of the displayed image at a first speed when the distance between the initial coordinates and the second position of the touch input is less than a first predetermined distance, and controls the display to change the scale of the displayed image at a second speed, which is greater than the first speed, when the distance between the initial coordinates and the second position of the touch input is greater than or equal to the first predetermined distance.

* * * * *